United States Patent [19]

Åström et al.

[11] Patent Number: 6,058,303
[45] Date of Patent: *May 2, 2000

[54] SYSTEM AND METHOD FOR SUBSCRIBER ACTIVITY SUPERVISION

[75] Inventors: Bo Arne Valdemar Åström, Hågersten; Björn Arne Svennesson, Danderyd; Gulamabbas Sumar, Kista, all of Sweden; Robert Johannes Bernardus Schmersel, Breda, Netherlands

[73] Assignee: Telefonaktiebolaget L M Ericsson (publ), Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/723,620

[22] Filed: Oct. 3, 1996

Related U.S. Application Data

[60] Provisional application No. 60/024,917, Aug. 30, 1996, provisional application No. 60/024,972, Aug. 30, 1996, provisional application No. 60/024,930, Aug. 30, 1996, and provisional application No. 60/024,975, Aug. 30, 1996.

[51] Int. Cl.[7] .................................................. H04Q 7/22
[52] U.S. Cl. ......................... 455/413; 455/435; 455/461
[58] Field of Search .............................. 455/412, 413, 455/435, 461, 466

[56] References Cited

U.S. PATENT DOCUMENTS

| | | | |
|---|---|---|---|
| 5,008,926 | 4/1991 | Misholi | 379/88.13 |
| 5,479,495 | 12/1995 | Blumhardt | 379/207 |
| 5,483,587 | 1/1996 | Hogan et al. | 379/202 |
| 5,794,143 | 8/1998 | McCarthy et al. | 455/435 |

FOREIGN PATENT DOCUMENTS

| | | |
|---|---|---|
| 2126171 | 12/1994 | Canada . |
| 0 662 763 A2 | 7/1994 | European Pat. Off. . |
| 0 631 452 A1 | 12/1994 | European Pat. Off. . |
| 0 699 009 A1 | 2/1996 | European Pat. Off. . |
| 0 714 214 A2 | 5/1996 | European Pat. Off. . |
| WO 87/07801 | 12/1987 | WIPO . |
| WO 95/20857 | 8/1995 | WIPO . |

OTHER PUBLICATIONS

Dieter Hochreuter, ISDN–TK–System integriert Telefax–, Teletex–und PC–Kommunikation, ISDN–Anwendungen, NTZ Nachrichten Technische Zeitscharift 45 (1992) Mai, No. 5, Berlin, DE, pp. 340–347 (not translated).

P. Baggia, A. Ciaramella, D. Clementino, L. Fissore, E. Giachin, G. Micca, L. Nebbia, R. Pacifici, G. Pirano, and C. Rullent, A man–machine dialogue system for speech access to E–mail information using the telephone: implementation and first results, CSELT Technical Reports, vol. XX, No. 1, Mar. 1992, pp. 79–83.

T. Yoshida, M. Sasaoka and M. Ohyama, A Voice Store and Forward System Based on DSP Technique and Its Performance, The New World of the Information Society, ICCC—1985, pp. 631–636.

E.S. P. Allard, N. Day, Switching of Information Services in the UK Network and Evolution Towards the Intelligent Network, International Switching Symposium, Stockholm, Sweden, May 27–Jun. 1, 1990, Session B2, Paper #1, vol. 1, pp. 119–122.

Judy E. Tschirgi, Praful B. Shanghavi and Earle H. West, Speech Technology and Applications in the Intelligent Network, IEEE 1992, pp. 0071–0075.

L. Dittrich, P. Holzner and M. Krumpe, Implementation of the GSM–Data–Services Into the Mobile Radio System, 11312 MCR Mobile Radio Conference, Nice, France, Nov. 13–15, 1991, pp. 73–83.

Primary Examiner—Andrew M. Dolinar
Attorney, Agent, or Firm—Jenkens & Gilchrist, P.C.

[57] ABSTRACT

A system and method for monitoring the activity of a mobile subscriber in a GSM-based PLMN system from an Intelligent Network (IN) telecommunications system comprising several Intelligent Peripherals (IPs) connected to a Service Control Point (SCP) over a network. The detailed technique is automatically initiated when the Service Control Point (SCP) of an IN system attempts to reach a mobile subscriber and fails. In the first phase, the SCP arms an SMS-IP using a dummy SMS message. Upon the detection of renewed subscriber activity of a mobile subscriber who was previously inactive or unreachable, a PLMN triggering notification is generated. In this second phase, the PLMN transmits an alert to the SMS-IP which in turn notifies the SCP.

32 Claims, 9 Drawing Sheets

|      | SCEF | SMF | SDF | SCF | SSF | SRF | CCF |
|------|------|-----|-----|-----|-----|-----|-----|
| SCEP | X    |     |     |     |     |     |     |
| SMP  |      | X   |     |     |     |     |     |
| SDP  |      |     | X   |     |     |     |     |
| SCP  |      |     | (X) | X   |     |     |     |
| IP   |      |     |     |     |     | X   |     |
| SSP  |      |     |     |     | X   | (X) | X   |
| SSCP |      |     | (X) | X   | X   | (X) | X   |
| SN   |      |     | (X) | X   | X   | (X) | X   |
| NAP  |      |     |     |     |     |     | X   |

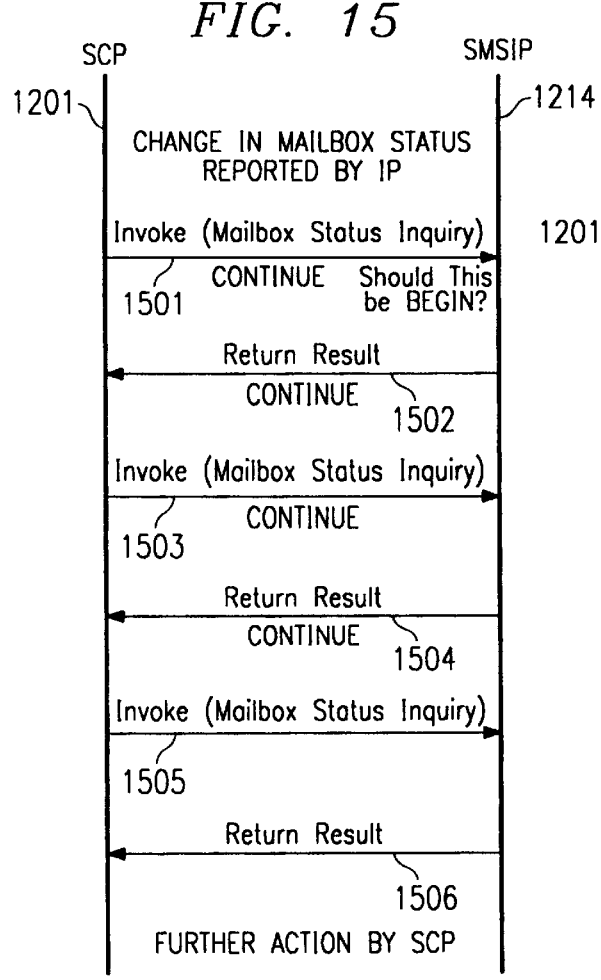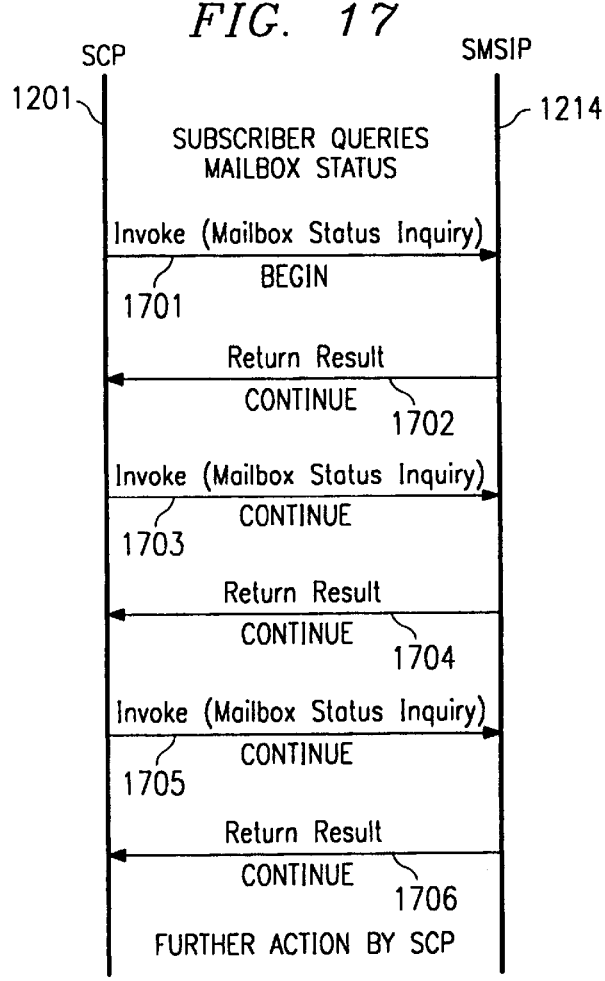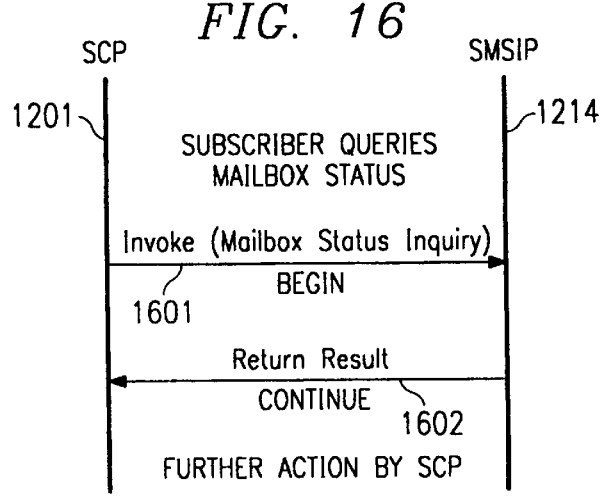

SYSTEM AND METHOD FOR SUBSCRIBER ACTIVITY SUPERVISION

CROSS REFERENCES TO RELATED APPLICATIONS

This U.S. Patent Application claims the priority benefits under 35 U.S.C. § 119(e) of U.S. Provisional Applications: (1) SYSTEM AND METHOD FOR CONTROLLED MEDIA CONVERSION IN AN INTELLIGENT NETWORK, Ser. No. 60/024,917 (Attorney Docket No. 27946-00156L), filed Aug. 30, 1996; (2) SYSTEM AND METHOD FOR SUBSCRIBER ACTIVITY SUPERVISION, Ser. No. 60/024972, (Attorney Docket No. 27946-00157L), filed Aug. 30, 1996; (3) SYSTEM AND METHOD FOR INCOMING AND OUTGOING INTERROGATIONS FOR STORE-AND-FORWARD SERVICES, Ser. No. 60/024,930 (Attorney Docket No. 27946-00158L), filed Aug. 30, 1996; and (4) SYSTEM AND METHOD FOR IP-ACTIVATED CALL SETUP, Ser. No. 60/024,975 (Attorney Docket No. 27946-00159L), filed Aug. 30, 1996.

This U.S. Patent Application contains subject matter related to the following, U.S. Patent Applications: (1) SYSTEM AND METHOD FOR CONTROLLED MEDIA CONVERSION IN AN INTELLIGENT NETWORK, Ser. No. 08/724,845 (Attorney Docket No. 27946-00156), filed Oct. 3, 1996, in the names of Bo Arne Valdemar ÅSTRÖM, Robert Johannes Bernardus SCHMERSEL, Gulamabbas SUMAR and Björn Arne SVENNESSON now U.S. Pat. No. 5,838,768; (2) SYSTEM AND METHOD FOR INCOMING AND OUTGOING INTERROGATIONS FOR STORE-AND-FORWARD SERVICES, Ser. No. 08/724,769 (Attorney Docket No. 27946-00158), filed Oct. 3, 1996, in the names of Bo Arne Valdemar ÅSTRÖM, Robert Johannes Bernardus SCHMERSEL, Gulamabbas SUMAR and Björn Arne SVENNESSON; (3) SYSTEM AND METHOD FOR IP-ACTIVATED CALL SETUP, Ser. No. 08/725,431 (Attorney Docket No. 27946-00159), filed Oct. 3, 1996, in the names of Bo Arne Valdemar ÅSTRÖM, Robert Johannes Bernardus SCHMERSEL, Gulamabbas SUMAR and Björn Arne SVENNESSON; and (4) A SYSTEM AND METHOD FOR ROUTING MESSAGES IN RADIO COMMUNICATION SYSTEMS, Ser. No. 08/141,085, (Ericsson Reference No. P05915-US), filed Oct. 16, 1996, in the names of Bo ÅSTRÖM and Roland DODIN. These co-pending Patent Applications and any other domestic or foreign Patent Applications deriving therefrom and the disclosure(s) contained therein are all hereby incorporated by reference herein.

The present Patent Application and all the related co-pending Patent Applications identified above have been or will be assigned to Telefonaktiebolaget L. M. Ericsson (publ).

1. Technical Field of the Invention

The invention relates to the provision of supplementary telecommunications services, and more particularly, to a system and method for facilitating the monitoring of activity of a mobile subscriber.

2. Description of Related Art

Customer demand for customized telecommunications services has been growing ever more rapidly. Special subscriber features such as Call Waiting, Call Forwarding, Abbreviated Dialing, etc., are becoming increasingly important to individual subscribers for the added convenience they provide, as well as to telecommunications service providers as sources of additional revenue. Such services are generally provided by special programming in the software of the central office exchange serving a particular subscriber. That is, the local exchange switch software is separately programmed to provide special service features to the subscribers connected thereto. Often both the hardware and the software of an exchange must be upgraded in order to enable the provision of special subscriber functionality.

When a call involves an interconnection between two parties connected to different exchanges, it is completed via a so-called transit or tandem exchange which forms part of the network interconnecting individual central office switches to one another. In such cases, the transit exchange is totally transparent to the two parties of the call and simply provides a voice path between the two end offices. Any special service features invoked by either party has traditionally been provided by the end office to which that subscriber is connected, independently of the network connection between the two parties.

In most telecommunications systems providing Plain Old Telephone Service (POTS), the communications link between a calling party (A-Party) and the called party (B-Party) is under the control of the A-Party. Consequently, the communications link between the A-Party and the B-Party remains in place until the A-Party's telephone instrument is placed "on-hook" in which case the system breaks the communications link and the end offices of both parties and in any transit exchange's which have been used to link the end offices together. If the B-Party were to place his or her telephone instrument on-hook, it has little effect until after a period of the order of several minutes when a timer triggers the disconnection of the circuits between the calling and the called parties. In newer types of telecommunications services, such as the Integrated Services Digital Network (ISDN), B-Party disconnect is employed but the mechanisms for implementing it are considerably different from those of conventional POTS networks.

Providing special subscriber services within conventional telecommunications exchange requires an extensive upgrading of the software of each and every individual exchange which is to furnish such special services to its customers. Such upgrading of exchanges is often extremely expensive and virtually prohibitive from a cost-effectiveness standpoint with regard to the additional revenue provided by the additional subscriber services. This observation is even more true in small towns or rural areas where the demand for special subscriber services is relatively low and where existing exchanges have been in place for a considerable period of time and continue to adequately serve the basic telecommunications needs of a majority of the subscribers in that area.

The telecommunications business is facing increasing competitive pressures. The per-minute revenues of telecommunications operators everywhere has been steadily decreasing due to a number of factors. The deregulation of telecommunications services has increased the number of competitors in the business. Further, innovations like call-back services and calling cards permit users to arbitrage differences in bilateral calling rates between country pairs. Also, cable television companies have now started offering telephone services over their cable networks. Finally, innovative software has now made high-quality full-duplex calls over the Internet feasible.

Improvements in technology have also reduced the cost of providing basic telephone service. The telecommunications companies can no longer justify the relatively high tariffs levied on the provision of basic telephone services.

Improvements in technology have lowered the actual cost of delivering a telephone call to virtually nothing. In economic terms, basic telephone services can be viewed as zero marginal cost business. The advances that have increased the power to price performance ratio of desktop computers over the years have also boosted the reliability and efficiency of modern telephone exchanges.

The same situation obtains on interexchange connections also. Due to the use of optical fibre, a substantial amount of capacity has been added to the telephone networks. Bandwidth no longer appears to be the scarce resource that it was just a few years ago, and, in fact has become a commodity that is frequently bought and sold in wholesale quantities.

Improvements in technology have also reduced or eliminated the effects of the geographic distance between a calling party and a called party as a significant factor in the cost of providing a telephone call. It has been argued that it cost no more in terms of network resources to call from Stockholm to Dallas (a distance of about 8,000 kilometers) than it does to call from Dallas to Austin (a distance of about 300 kilometers).

The explosive growth of the Internet has largely been due to the exploitation of the fact that its basic TCP/IP protocol permits e-mail messages to be sent and file transfers to be effected independent of the transmission distances involved.

In spite of the fact that the provision of long distance services does not cost much more than that of local basic telephone services, telecommunications operators continue to charge more for long distance telephone calls than for local calls. The increase in competition in the telecommunications industry is likely to make that situation increasingly unsustainable. Since long distance calls have traditionally been a significant source of the operating profits of the telecommunications companies, it has become increasingly obvious that the telecommunications companies need to find new sources of revenue.

One way in which telecommunications operators can increase revenues is by offering subscribers advanced services for which the subscribers would be willing to pay a premium for. As described earlier, in the network architectures of the past, the additional of new functionality to a network required that core exchange software be rewritten—an expensive and lengthy process that also carried the additional risk of introducing new bugs into the system. Furthermore, each exchange in the network has to be updated with the new software which further increased the cost of introducing new services. Telecommunications operators are no longer willing to tolerate such a state of affairs. There are great business opportunities for a telecommunications equipment manufacturer who can bring a product to the market first.

Telecommunications operators have expressed a need for faster and less expensive techniques for the introduction of new services into their telecommunications network. Further, they have desired that the impact of the new functionality be limited to one or a few exchanges only. It has also been found desirable for service-administration tasks such as the installation or modification of services, the addition of customer-specific data, etc., be capable of being handled from a central management facility.

It has also been desired that the design and implementation of the new services be done by the telecommunications operators rather than the equipment manufacturer. This would allow telecommunications operators to quickly react to perceived market needs and serve their customers more effectively and efficiently. It has also been found desirable to incorporate greater intelligence in the exchange software to permit various services to interact with subscribers. In this manner, the telephone instrument can become an advanced interface to the telecommunications network.

The Intelligent Network (IN) has been proposed as a solution to address the above requirements. The IN technology is designed to allow a telecommunications operator to design its own set of unique services or to adapt existing services to specific customer requirements. Further, the IN architecture permits the impact of installation of new services to be limited to a few control nodes.

Another design feature of the IN architecture is its centralized administration of services. This improves the response time and decreases the human resource overhead required to run the network. Furthermore, the IN architecture permits customer control of some customer-specific data.

For example, some telecommunications operators offer "personal number" services. The personal number service involves giving each subscriber a specific telephone number, usually one prefixed with an "area code" of 500. The design philosophy behind the personal number service is to supplant the plethora of contact numbers for each subscriber with just one phone number. Thus, when someone dials a subscriber's personal number, the exchange switch will query a central database and obtain a list of all of the telephone numbers where the subscriber might possibly be reached. The switch will then ring each of those numbers in a predetermined order until the call gets answered.

In one variant of this service, a subscriber may be provided the ability to dynamically update the contact number database from any telephone instrument. Such customer control can permit a subscriber to add the number of a hotel or other location where he or she may be temporarily located.

The design philosophy behind the IN architecture is to reduce the time to market for the provision of new services, to lower development and administration costs, and to enhance profits deriving from the provision of premium services. The classic example of an IN service is the use of a single dialed number (the B-number) by customers spanning a large geographic area that is redirected to one of a plurality of local service centers. Thus, a pizza franchise can advertise a single telephone number for ordering pizzas. Whenever a customer dials the advertised number, the IN service can direct the call to the nearest franchisee based upon the number of the dialing subscriber (the A-number).

A Brief History of IN

The Intelligent Network concept originated in the United States. Originally, the intent was to provide a central database for translating a single dialed number into a different terminating number. One of the earliest applications of IN services was to provide toll free calling ("Freephone").

Toll free numbers do not directly correspond to a physical telephone line, but need to be translated into an actual termination number. The translation may be dependent upon the location of the caller and upon the time of day.

A new signaling system called Signaling System No. 7 (SS7) was developed to allow high-speed communications between telephone exchanges before and during call setup. The SS7 protocol allowed for the first time, the fast database lookups needed for the implementation of toll-free calling. After the development of the SS7 technology, it became possible to exchange data across a telephone network virtually instantaneously. This was the genesis of the Intelligent Network.

The next step in the revolution of the IN was to move from static databases to dynamic ones that permitted customer control of customer-specific data. Additional interactivity came to be permitted when subscribers could control the progress of the call by keypad interaction from the subscriber's instrument. Such interactive IN is referred to in the U.S. as the Advanced Intelligent Network (AIN).

Present development and interest in the IN architecture is being driven by a few large-scale applications. Two such applications are the Universal Personal Number (UPN) Service and Virtual Private Network (VPN) Service. In the UPN service, a unique number is assigned to each individual rather than to a telephone instrument. The UPN number can be used to reach a subscriber irrespective of his or her location or type of network (whether fixed or mobile).

The VPN service allows a private network to be constructed using public network resources. Thus, a corporation could have a corporate telephone network that permits all of its employees to communicate with each other without investing in the hardware or software needed for providing a physical private network. By implementing a VPN service using the public network, a corporate customer can also avoid the costs of maintaining a physical network.

Inadequacies of Present IN Systems

The use of the Intelligent Network (IN) architecture has been advocated as a solution for speeding up the incorporation and roll out of new network capabilities and network services. However, the presently articulated standards for implementing IN concepts suffer from a number of shortcomings.

For example, in the Global System for Mobile Communication (GSM), a message service called the Short Message Service (SMS) has been specified. The SMS service enables short text messages to be sent to and from various mobile stations (MSs). An SMS message to a mobile station is always sent from an SMS Service Center (SMSC). If an SMS message cannot be delivered to a subscriber because the subscriber's mobile station is inactive or unable to receive SMS messages due to lack of memory, then the Home Location Register (HLR) associated with a Mobile Switching Center (MSC) creates a Message Waiting Data List (MWD-List) to store such undelivered messages.

When a subscriber activates his mobile unit, the HLR is immediately notified. When the HLR detects that a previously inactive mobile station has become active, it immediately alerts the SMSC that had earlier tried to send an SMS message to the inactive mobile station. Upon receiving this alert, the SMSC is triggered to retransmit SMS messages that could not be delivered earlier because the mobile station had been inactive. Current implementation standards for IN do not have any mechanisms for providing similar or equivalent functionality.

If a telecommunications service provider were to be able to monitor the activity status of a mobile station, and generate a subscriber activity report to the Service Controlled Function (SCP) of an IN, then the service provider would be able to terminate a larger fraction of communication attempts. Consequently, the telecommunications service provider could earn greater revenues and also increase resource utilization within its telecommunications network.

Thus, it would be highly desirable to be able to provide some means within an Intelligent Network system, to monitor the activity status of a mobile subscriber and report the same to the SCP. This in turn, requires a system and method for probing a mobile station and generating a mailbox status report to the controlling entity (i.e. the SCP).

SUMMARY OF THE INVENTION

Therefore it is a primary object of the present invention to permit the easy detection of renewed activity of a mobile subscriber in a PLOT system. One embodiment of the present invention is implemented in an IN (Intelligent Network) telecommunications system comprising a plurality of IPs (Intelligent Peripherals) connected to an SCP (Service Control Point) and PLMN Gateways over a network.

In one embodiment of the present invention, the activity status of a mobile subscriber in a PLMN system is determined initially. If the mobile subscriber is found to be inactive, the PLMN system is armed remotely from the IN system to detect any renewed activity by the mobile subscriber. The activity status of the PLMN mobile subscriber is continuously monitored.

When renewed activity of the PLMN mobile subscriber is detected, the subscriber activity probe is triggered and an alert message is transmitted from the PLMN system to the IN system. This causes an internal report to be generated within the IN system that notifies the supervisory entity within the IN system to become aware that the mobile subscriber is again active and can now be reached through the PLMN system.

In another embodiment of the present invention, an SCP commands an SMS-IP to probe the activity status of a mobile subscriber. The SMS-IP in turn, sends a dummy SMS message to a Gateway Mobile Service Center (GMSC) in the PLMN system that is dedicated to handling SMS messages. Upon receiving the dummy SMS message, the SMS-GMSC activates the storage of non-delivered messages to a mobile subscriber by enabling the Message Waiting Data List (MWD-List) in the HLR of the mobile subscriber. The SMS-GMSC also acknowledges the arming of the PLMN to the SMS-IP. The SMS-IP in turn notifies the SCP that the "Send Probe" command has been successfully executed.

Upon the completion of these actions, the PLMN becomes armed. When a previously inactive mobile subscriber becomes active, the notification of the renewed activity to the HLR will result in the triggering and transmission of an "Alert" command from the PLMN to the SMS-IP. Upon receiving the alert from the SMS-GMSC, the SMS-IP unilaterally generates a "Mailbox Status Report" notification to the SCP.

BRIEF DESCRIPTION OF THE DRAWINGS

A more complete understanding of the method and system of the present invention may be obtained by reference of the detailed description of the preferred embodiments that follow, taken in conjunction with the accompanying drawings, wherein:

FIG. 15 is a sequence diagram illustrating the operation of the "Mailbox Status Enquiry" command when the SCP asks for detailed information about mailbox status;

FIG. 16 is a sequence diagram illustrating the operation of the "Mailbox Status Enquiry" command when a subscriber asks for brief information about mailbox status;

FIG. 17 is a sequence diagram illustrating the operation of the "Mailbox Status Inquiry" command when a subscriber asks for detailed information about mailbox status;

DESCRIPTION OF THE PREFERRED EMBODIMENT

The present invention provides a solution to one set of problems concerning the supervision of the activity status of mobile subscribers whose terminal units are inactive when the delivery of messages originating outside a PLMN network (such as electronic mail (e-mail) messages or SMS (Short Message Service) messages) is first attempted. The extensions to the IN concept disclosed and described in this application can also be used in other telecommunications contexts and can also facilitate the provision of related supplementary services to subscribers.

Intelligent Network (IN) Architecture

An Intelligent Network is a telecommunications network architecture that provides flexibility for facilitating the introduction of new capabilities and services into a network such as the Public Switched Telecommunications Network (PSTN) or a Public Land Mobile Network (PLMN). Examples of such new capabilities and services include toll free calling ("Free Phone"), credit card services and Virtual Private Networks (VPN).

IN embodies the dreams of the unbundled network of the future in which freedom is given to service providers and users to personalize the network services, independently of access, switch term technology and network providers. An international consensus view on IN is described in the ITU-TS Recommendation Q.1200.

Figure 1:
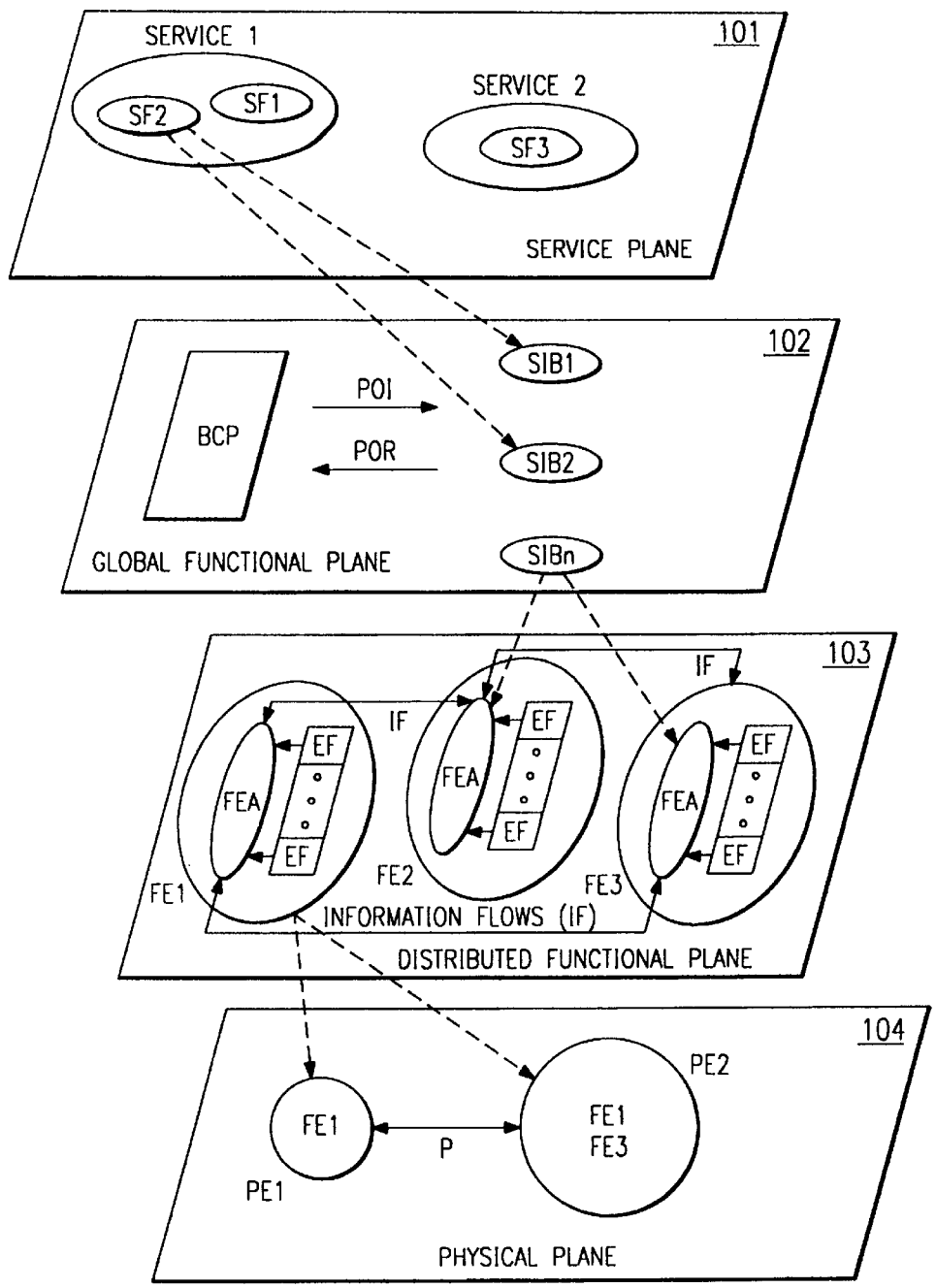
FIG. 1 is an illustrative diagram showing the standard Intelligent Network (IN) Conceptual Model.

The details of the IN architecture have been specified in the International Telecommunications Union (ITU) Recommendation I.312/Q.1201 which also contains a verbal explanation of the IN Conceptual Model (INCM) shown in FIG. 1. The ITU's IN Conceptual Model analyzes and systematizes the various tasks and processes associated with call handling and the provision of services into four planes: a Service Plane 101, a Global Function Plane 102, a Distributed Function Plane 103, and a Physical Plane 104.

So far, IN has been concentrated around a group of services referred to hereafter as Number Services, for example, toll free calling ("Free Phone"), credit card calling, personal number services, televoting, etc. A key characteristic of all these services is that they provide service to numbers that are unbundled from the access ports in the access nodes. Any node in the telecommunications network can be made a service node by the addition of a Service Switching Function (SSF) and/or Special Resource Function (SRF), both under control from a Service Control Function (SCF) via a service-independent protocol interface. The SCF is supported by a Service Data Function (SDF), which may be physically unbundled from the node.

The main building blocks of IN are the SSF, the SCF, the SDF and the SRF. The SRF is also referred to hereafter as the logical Intelligent Peripheral (logical IP). Each of these building blocks is a separate logical entity which may, but need not, be physically integrated with the other entities of the telephone network, logical or otherwise. The physical and logical entities are referred to interchangeably as one in the following description of the preferred embodiment.

The IN architecture divides the basic call process into discrete strictly-defined stages that gives telecommunications service providers and subscribers the ability to manipulate the call process. The components of a simple Intelligent Network 200 has been shown in FIG. 2. The standard architecture of the Intelligent Network has defined various components of the IN as well as the interfaces between the individual components.

When a call is made to an IN service, the call is first routed to a special node in the network that is called the Service Switching Point (SSP). If the SSP recognizes an incoming call as an IN call, then all further processing of the call is suspended while the SSP informs the Service Control Point (SCP), another node in the IN system, that an IN call has been received.

The SCP provides the "intelligence" in the "Intelligent Network." The SCP controls everything that happens to an IN call and makes all the call processing decisions. When the SCP decides upon the appropriate action that is to be performed on the call, the SCP instructs the SSP to carry out the necessary action.

The Service Control Function (SCF) contains the logic of an IN service and bears the complete responsibility for making decisions related to a call invoking that service. This service logic may run on any telecommunications platform (e.g., Ericsson's AXE platform or UNIX). The node (i.e., the physical hardware and the software) that contains the SCF is called the Service Control Point (SCP) 201.

The data needed for each service (e.g., the list of subscriber telephone numbers) is provided by the Service Data Function (SDF). In one implementation of the IN architecture, the data needed for the services is stored in the SCF itself. Formally, the function of storing the service-related data is allocated to the SDF which provides the data upon demand to the SCF. In a typical IN implementation, the SDF can be UNIX's machine running a commercially-available database program such as Sybase. The physical node that contains the SDF is referred to as the Service Data Point (SDP) 202.

The normal call handling and supervisory functions of an exchange are performed by the Call Control Function (CCF). While the CCF is not formally part of the standard IN architecture, the CCF provides the IN with information about calls and also executes orders that have been received by the SSF.

The Service Switching Function (SSF) interprets the instructions sent by the SCF and passes the commands to be executed to the CCF. The SSF also receives call event data (e.g., the onhook/offhook status of a subscriber or a subscriber line being busy) from the CCF and passes the data to the SCF. The physical node (i.e., the exchange hardware and software) that contains the SSF is referred to as the Service Switching Point (SSP) 204 and 205.

The Specialized Resource Function (SRF) provides certain resources for use in IN services, e.g., DTMF (Dual Tone Multiple Frequency) digit reception, announcements and speech recognition. In the ITU IN recommendations, the SRF communicates directly with the SCF. In another implementation of the IN, the SRF functionality may be co-located with the SSF. In this case the SRF does not communicate directly with the SCF, but via the SSF. The SRF is not shown in FIG. 2.

The Service Management Function (SMF) 207 administers the maintenance of IN services, e.g., the addition or removal of data or the installation or the revision of services. The Service Creation Environment Function (SCEF) 207 allows an IN service to be developed, tested and input to the SMF. In one implementation of the IN, the SMF and the SCEF are combined into one and termed the Service Management Application System (SMAS). The SMAS application is part of the TMOS family and runs under the UNIX operating system. It permits services to be designed using a graphical interface and provides convenient forms for the entry of service data.

Figure 2:
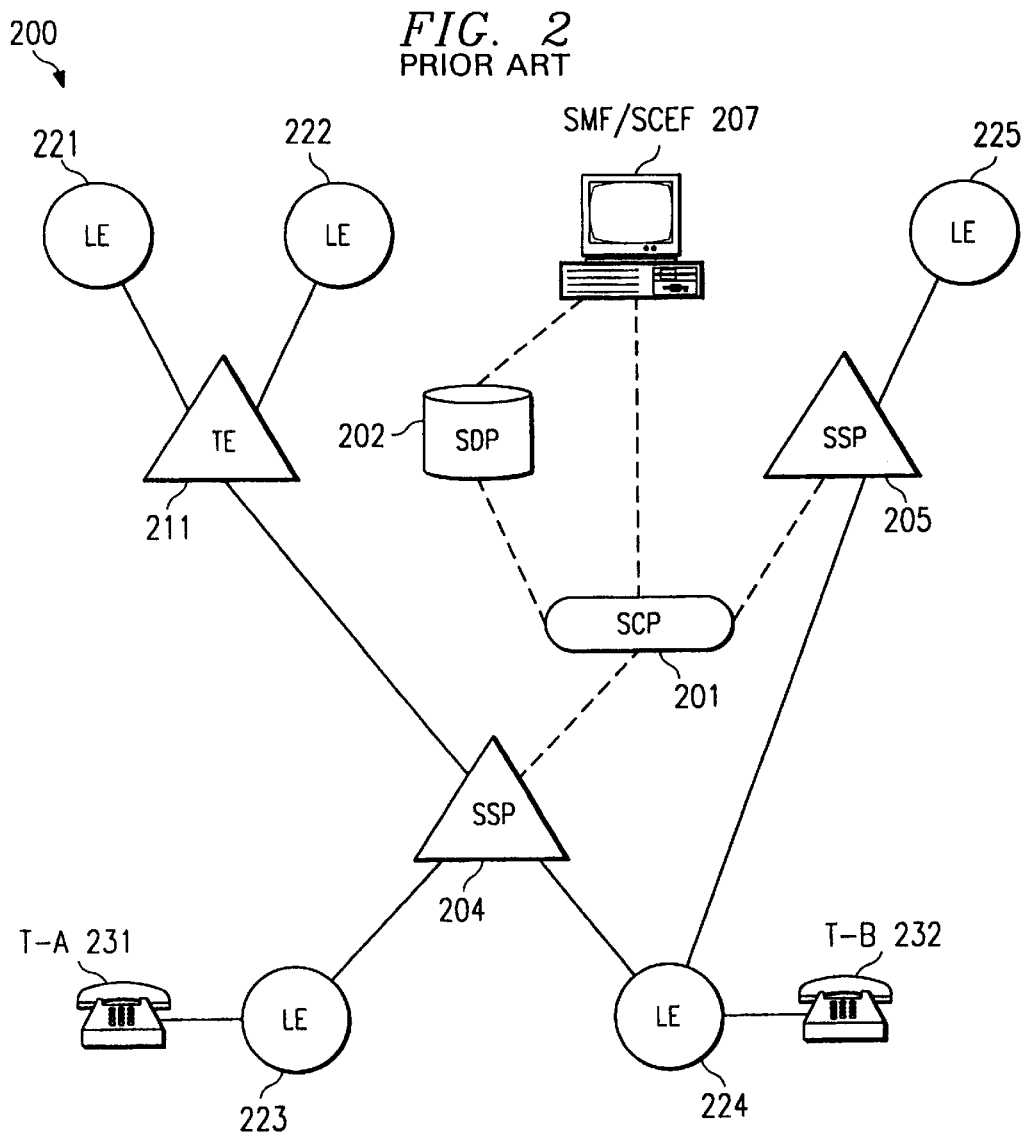
FIG. 2 shows the components of an exemplary simple Intelligent Network.

FIG. 2 shows an exemplary SCP 201 connected to an SDP 202 and SSPs 204 and 205. The SCP is also connected to an SMF/SCEF 207. All of the links running to and from the SCP 201 are shown as dashed lines in FIG. 2 to indicate that they are not voice links. The SDP 202 is also connected by a non-voice link to the SMF/SCEF 207. The SSP 204 is connected to two local exchanges (LEs) 223 and 224 as well as to a transit exchange (TE) 211. The transit exchange 211 in turn is connected to two other local exchanges 221 and 222. The SSP 205 is connected to local exchange 225. The local exchanges 223 and 224 are shown in FIG. 2 to be connected to an exemplary originating subscriber T-A 231 as well as to an exemplary terminating subscriber T-B 232.

If each of the logical building blocks of the IN are also physical entities, in the notation described earlier, the corresponding physical nodes are called the Service Switching Point (SSP), the Service Control Point (SCP), the Service Data Point (SDP), and the physical Intelligent Peripheral (IP). As stated earlier, in the discussion that follows, the term IP is used to generally refer to both a logical IP as well as a physical IP.

The user agent is identified in the SCF by the calling or the called party number, and invoked when an armed trigger point in the serving node is hit. Signaling data and call state data can be manipulated by the user agent. The SRFs are capable of in-band communication with the users or with each other to overcome limitations in the current signaling systems.

Current IN standards assume that the visited location and the home location of a subscriber are collocated but possibly unbundled from the access node and the service node. Although the separation of the access node and the service node functions reduces service introduction costs, it results in potentially unwanted interactions between access port services and number-based services. An enhancement of the access node to a service node is therefore required to provide flexibility in service design.

An alternative would be to add two remotely changeable personal telecommunications categories to the access nodes—one providing an unconditional hot-line connection to the service node for originating calls, and the other giving an unconditional call forwarding to the service node for terminating calls. It appears necessary in the longer term to separate the visited and home location functions as in cellular networks if costs are to be reduced and capacity is to be improved.

Figure 3:
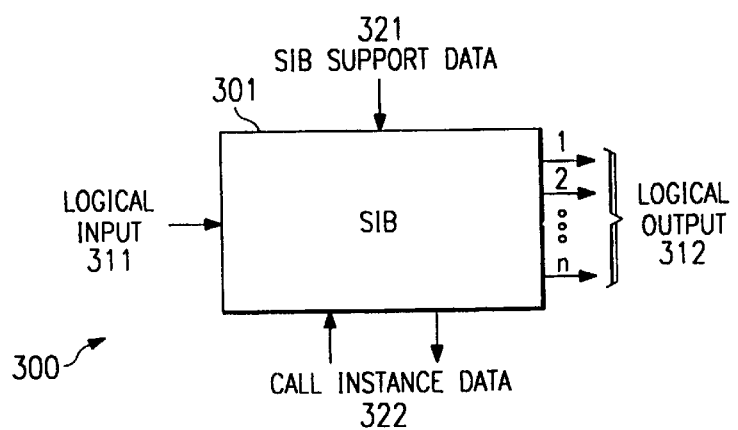
FIG. 3 shows the structure of a Service Independent Building Block (SIB)

One of the unique characteristic of IN is that services are implemented on the IN service platform based on its service independent building blocks (SIBs), and not directly in the network nodes. The SIBs are part of the SCP. FIG. 3 shows the structure of a SIB. Each SIB 301 is an elementary logical element in a service logic that hides the implementation from the programmer. When existing SIBs cannot meet a new requirement, new SIBs are defined.

In IN products, the SIBs 301 perform functions such as analysis of signaling information, control of connection topology, interaction with the user, reading and writing of data, collection and output of call data, etc. Other SIBs are pure language elements such as jump, go to subroutine, loop, handover, etc. Each SIB 301 is available in the service platform. Service Logic Programs (SLPs) are built by SIBs 301 and refer to by their names. Service logic can be designed using a Service Creation Environment Function (SCEF). The SIBs 301 are made available to the SCEF through a system-independent Application Programming Interface (API).

Figures 4, 5:
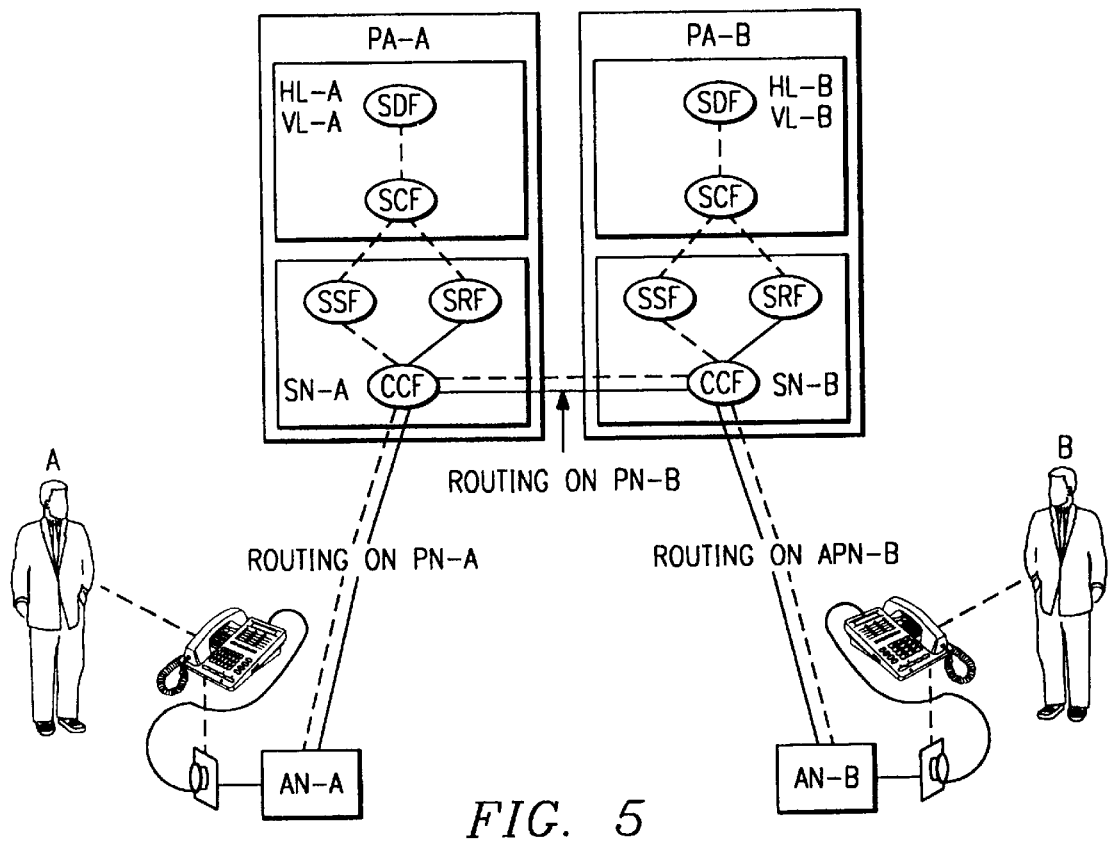
FIG. 4 shows the mapping of the various IN functional entities into physical units.
FIG. 5 shows an example of an IN implementation with service nodes at the transit level.

The mapping of the various IN functional entities into physical units or entities is shown in FIG. 4 where the suffix "F" stands for the various functional entities and the suffix "P" stands for physical entities. In FIG. 4, the acronym SMF refers to the Service Management Function and the acronym CCF refers to the Call Control Function.

An example of an IN implementation with service nodes at the transit level is illustrated in FIG. 5. The service nodes shown in FIG. 5 can be reached from any access node such as a local switch in PSTN or ISDN or an MSC in a Public Land Mobile Network (PLMN) system. The service nodes can serve both personal telephony as well as other number-based services. User identities and authentication information may be transferred in-band to the SRF or embedded in calling- and called-party number fields in the signaling systems.

The personal agent has components in the Call Control Function, CCF (i.e., the trigger point data), the Service Control Function, SCF (i.e., the service logic), and in the Service Data Function, SDF (i.e., the service data). The IN platform components illustrated in FIG. 5 can be either integrated into the access nodes or implemented in separate service nodes.

The role of the Service Switching Function (SSF) is to recognize that a call is invoking an IN service, and then to communicate with the SCF to receive instructions about how to handle the call. The SCF is where the intelligence of the IN resides as it contains the logic required to execute various services. The SDF is a database system that provides the data storage capacity needed for the data intensive supplementary services. The IP is the network element that provides resources for user interaction such as voice announcements and dialogue, dual tone multi-frequency reception (DTMF) and voice recognition.

The IN Application Programming Interface (API)

Figure 6:
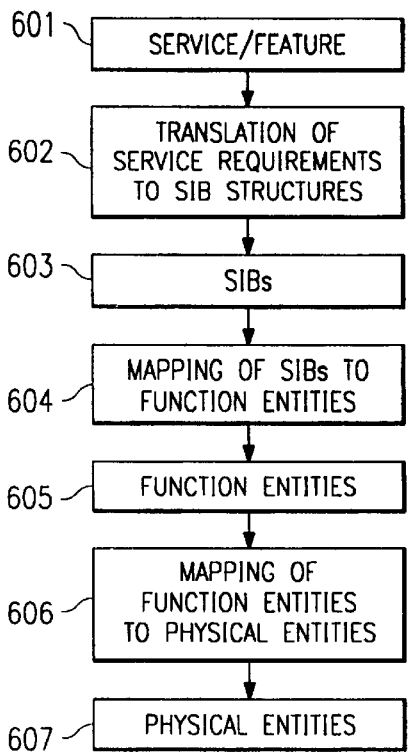
FIG. 6 shows the preferred methodology for implementing various services in the IN Conceptual Model.

The ITU's IN Conceptual Model shown in FIG. 1 also defines the methodology for implementing various services. This is shown in FIG. 6. In order to implement a service or feature 601, the service requirements are first translated to SIB structures at 602. The resulting SIBs 603 are mapped at 604 to various Functional Entities 605. The Functional Entities 605 in turn are mapped at 606 to one or more Physical Entities 607.

It should be noted that unlike the practice with all non-IN standards, the service requirements in IN are not directly translated into network functionality. Instead, the service requirements are translated into service platform elements (i.e., SIBs) which in turn are implemented according to the IN three-stage model to become reusable capabilities and protocol elements in the telecommunications network.

There are at least two possible approaches toward implementing the Application Program Interface (API) that conform to the ITU's IN Conceptual Model shown in FIG. 1. One approach would be to split the service logic into two parts: a fixed logic part and a flexible logic part. The SIBs are then linked to form decision graphs that are called as subroutines by the fixed logic. The fixed logic can be expressed in a standard programming language such as C or C++, etc., and compiled and loaded into a standard execution environment. The flexible logic part, in contrast, consists only of exchangeable data.

The second approach would be to define a service API that gives full control over all aspects of the logic by combining SIBs with each other to achieve the desired function. Each SIB can be linked to any other SIB in this approach. Some SIBs perform a telecommunications function while others are only linking elements in the logic. All logic is expressed as data that describes which SIBs are to be used, how they are linked, and what data each SIB is to use to perform its function. All implementation details are thus hidden from the service programmer. This is the principal approach taken in Ericsson's IN products.

Figure 7A:
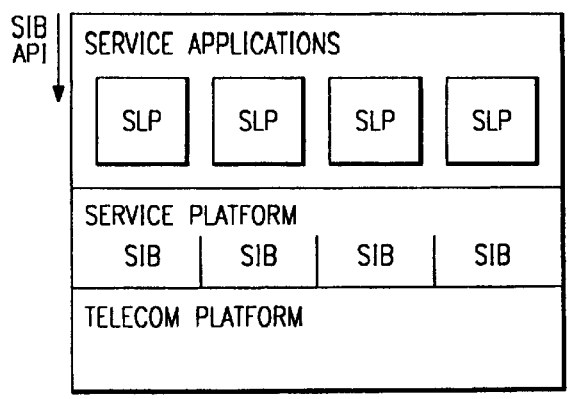
FIGS. 7A and 7B illustrate two approaches towards implementing an API.
Figure 7B:
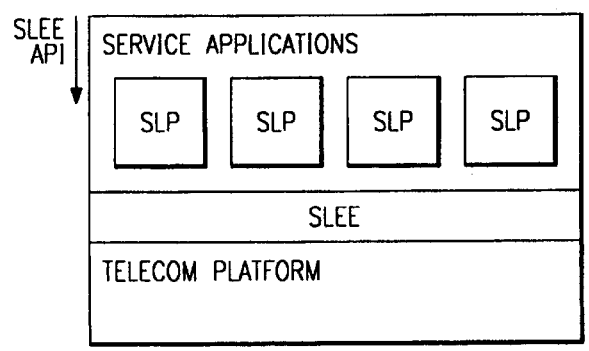

The two approaches toward implementing the API are illustrated in FIG. 7. The SIB-platform approach is shown in FIG. 7A, and the Service Logic Execution Environment (SLEE) approach is shown in FIG. 7B. The SIB approach of FIG. 7A expresses all service logic as a combination of elementary SIB functions that are available in the service platform to form flexible service profiles (FSPs). The SLEE approach shown in FIG. 7B considers the SIBs as subroutines to the fixed logic expressed in a programming language such as C, C++, Service Logic Programs (SLPs), etc. The compiled code uses telecommunications platform primitives, such as INAP (Intelligent Network Application Part) operations and database primitives.

Figure 8:
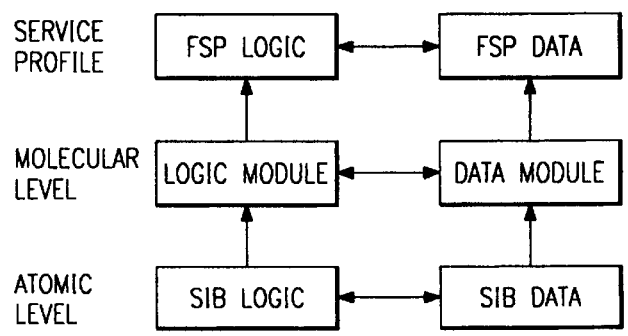
FIG. 8 shows one technique for defining personal agents using Service Logic Programs (SLPs)

When the same data representation is used for all logic and data, personal agents can be defined by means of Flexible Service Profiles (FSPs), as shown in FIG. 8. This arrangement offers a number of advantages, for example, permitting different logic elements to be loaded and activated without disrupting service, and in case of a fault in a personal agent, limiting the affected zone to only calls activating the faulty function.

Feature interaction has been a major obstacle in the development of IN systems. This problem arises from the fact that each feature is normally dependent on other features. There is a need to resolve such interactions, but no solution has yet been agreed on. It has been found in practice that existing feature implementations are often affected and many have to be redesigned or completely blocked when new features are introduced. It should be noted that this problem can be approached from two viewpoints: the network-centric view and the user-centric view of IN systems.

The traditional network-centric view sees IN as a complement to other technologies in adding supplementary services to an existing repertoire. Feature interaction has and continues to be the obstacle that prevents this view from being a realistic alternative. Each new supplementary service is composed of a fixed service logic part, and potentially of a flexible logic part. Personalization is thus limited to what can be achieved by combining a number of pre-defined supplementary services or features with each other. The addition of a new service may require long and costly development, not different from the pre-IN experiences in PSTN, PLMN and ISDN. The central issue in this viewpoint is not the design of a new feature, but on the task of integrating a new feature with other preexisting features.

In contrast, the user-centric view of IN focuses on the users rather than on the features. In principle, the needs of individual users are assumed to be unique, with the service provider being in full control of all service logic. The FSP approach is applied, and the result is that a range of unique service profiles can then be created by reusing SIBs rather than reusing features. This means that feature interaction ceases to be a problem, since no individual features are implemented. The interaction between the SIBs constitutes the service logic in this approach.

Interaction between service profiles in this approach is resolved through open signaling interfaces according to the half-call model. Before complete control can be provided from the step-wise developed IN platforms in an economically feasible way, it has been found necessary to use some of the existing supplementary services. It should be borne in mind that this is a shortcut that can result in interaction problems requiring enhancement of the IN platform in the future.

The principal goal in the user-centric view is to make the SIBs standardized so as to achieve both service-independence and system-independence and technology-independence. When this is achieved, a SIB-based service profile can be executed on any compatible platform, whether it is a switch processor, a stand-alone personal computer, or work-station. The old paradigm, giving the same features to all subscribers, is replaced by feature transparency for each individual subscriber, irrespective of access.

IN Signaling

The Intelligent Network Application Part (INAP) Protocol is used for signaling in IN systems. The INAP signaling protocol has been standardized by both the European Telecommunications Standards Institute (ETSI) and the International Telecommunications Union (ITU), and includes the CCITT Signaling System No. 7 (CCS7) which is one, but not the only network protocol that may be used to support INAP.

One of the shortcomings of the core INAP as it is specified today (i.e., the IN CS-1 standard), is that the communication possibilities between the SCF and the IPs are restricted to speech only. Other media such as e-mail, facsimile, data, etc. are currently not supported by the CS-1 standard. Thus, non-call-related and non-real time call-related services are not included in the present CS-1 standard.

The Networked IP (NIP) implementation, of which the present invention is a part, can be characterized as an extension to the INAP to include the handling and processing of non-voice media and the provision of non-call-related communication between the SCF and the IPs. NIP allows the SCF to be in total control of all store-and-forward (i.e. messaging) services such as voice mail, e-mail, SMS messages, etc. The protocol used for the NIP implementation is referred to hereafter as NIP-INAP. The NIP-INAP is an Ericsson-specific extension to the IN CS-1 standard.

Cellular Network Architecture

In the second generation of standards for digital cellular telecommunications systems, e.g., GSM, Base Station Controllers (BSCs) act as access nodes. Each Visited Mobile Switching Centers (V-MSC) comprises hardware and software having the functionality of both a VLR as well as an MSC. Thus, each V-MSC can act as both a switching center as well as a visited location with transparent signaling to the corresponding BSC.

It should be noted that nodes in a GSM system have been standardized to such an extent that new services and features cannot be added without violating (or at least derogating from) the standard. In contrast, the standards governing nodes in an IN system permit extensive customization.

A separate location management mechanism has been developed to associate terminal identities with the geographical and physical addresses that may change when the terminals move. In GSM, each terminal receives its identity from a user's SIM card inserted in the terminal, and bears no association with its physical location in the network.

An addressable entity called the Home Location Register (HLR) handles the terminal agent functions for a partition of the terminal number series. The HLR integrates a number of functions. For example, the HLR performs location management of the call managers to ensure that the flexible (or variable) portion of a subscriber's service profiles are currently updated in every visited location where the fixed portions of the profile have been installed.

The HLR also provides assistance in call set-up to the terminal by forwarding call data to the VLR, and obtaining in return, the Roaming Number (RN), which is then used to set up the connection for the call through the PSTN. The RN is used only during call set-up, to associate the terminal number with the connection, thus circumventing the limitations of the PSTN signaling that permits it to carry only one called party number. The HLR also provides for direct communication with the terminals (using the MAP protocol) to receive service management directives. The use of the personal SIM card unbundles the user from the terminal. However, current standards do not permit more than one user to be registered at any one terminal at a given time.

The supplementary services that are provided to subscribers have also been standardized in GSM. The majority of these supplementary services, especially those using call state information, are implemented in the visited locations. Call forwarding services are performed by the HLR. Use of the same standard by a large number of operators provides feature transparency for users over very large areas.

GSM, for example, will cover all of Europe and several countries. The large number of competing operators and vendors involved make it difficult to arrive at a consensus on additions, amendments or adaptation for personalization. Consequently, the provision of additional functionality and of supplementary services need to be done outside the GSM standard.

Figure 9:
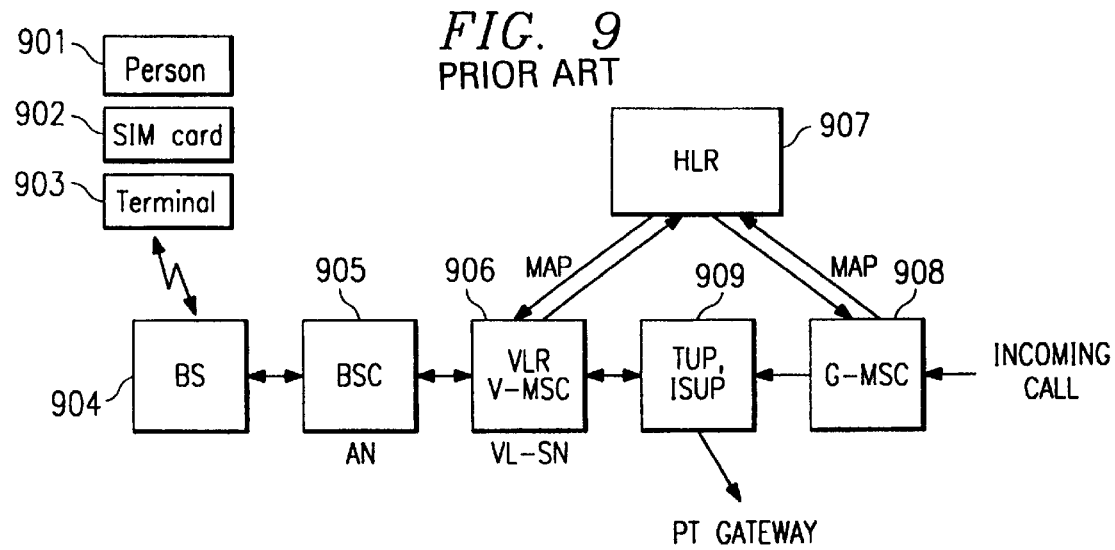
FIG. 9 shows the architecture of an exemplary mobile radio telecommunications network.

FIG. 9 shows the architecture of an exemplary mobile radio telecommunications network. A cellular network comprises a terminal 903 into which a subscriber 901 inserts a personal SIM card 902. The terminal communicates with a Base Station (BS) 904 over an air interface, such as an air interface specified in an existing communication system. In an alternative implementation of the GSM system, the terminal 903 has an identity of its own that is built in by the manufacturer of the terminal.

Registration and service management, as well as terminating call management based on user changeable data, are all performed in the Home Location Register (HLR) 907. Originating call management and terminating call management based on terminal status are handled by the Visited Mobile Switching Center (VMSC) 906 that also contains the Visitor Location Register (VLR). The VMSC is (conceptually) both the visited location as well as the serving node.

Routing to a cellular terminal is made by using the Roaming Number (RN) that is obtained using the signaling between the Gateway MSC (GMSC) and the Visited MSC (VMSC) via the Home Location Register (HLR). The Mobile Application Part (MAP) signaling protocol is used for the signaling between the GMSC 908 and the VMSC 906. It should be noted that the signaling between every GMSC and every VMSC is performed through a HLR and not directly. The CCITT Signaling System No. 7 Telephone User Part (TUP) and the CCITT Signaling System No. 7 Integrated Services User Part (ISUP), shown as element 909 in FIG. 9, connect the cellular system to the public telephone system gateway node. The Base Station 904 is controlled by the Base Station Controller (BSC) 905 that also serves as an access node.

SMS Service in Cellular Systems

Figure 10:
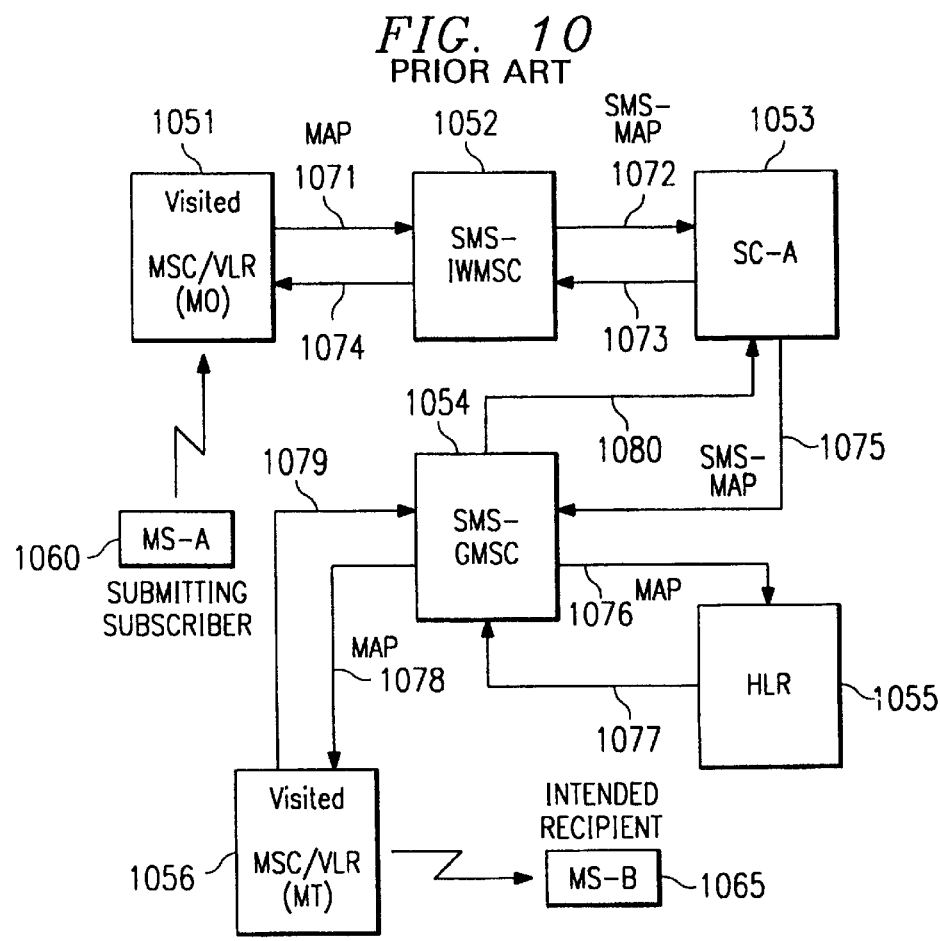
FIG. 10 shows the operation of the Short Message Service (SMS) in a mobile radio telecommunications system.

The operation of the Short Message Service (SMS) in a cellular system is depicted in FIG. 10. The originator of a Short Message (SM) shown as MS-A 1060 in FIG. 10 sends a Mobile Originated Short Message (MO-SM) to a service controller selected by MS-A 1060. The MO-SM is sent by issuing a "Forward SM" MAP command from the visited MSC/VLR 1051 to the Interworking MSC (IWMSC) 1052.

The transmission 1071 from the MSC/VLR 1051 to the IWMSC 1052 is performed by using the selected SC-A address as a "Global Title" as specified in the E.164 standard. The IWMSC 1052 analyzes the SC-A address in the "Called Address" SCCP component, changes the translation type and forwards the MO-SM to SC-A 1053 using the "Forward MO-SM" command in the SMS-MAP protocol, as shown at 1072.

When the Mobile Originated Short Message reaches the selected Service Center (SC-A) 1053, the SC-A executes one of a plurality of actions according to the directions or preferences of the Mobile Subscriber A 1060. It should be noted that the mobile subscriber's preferences need to be stored in the Service Center 1053 before such preferences can be executed.

In one embodiment of the present invention, the Service Center SC-A 1053 can perform a number of operations on the Mobile Originated Short Message. Examples of such actions include duplication and storage of a received Short Message, retransmission of a Short Message based upon a distribution list defined by MS-A 1060; conversion of an SM to a desired or preferred medium, etc. All of these actions can be based either on an indicated Protocol ID (PID) value or are based upon a subscriber defined profile value. These extensions to the standard functionality of a SMS system are described in greater detail in U.S. Patent Application entitled A SYSTEM AND METHOD FOR ROUTING MESSAGES IN RADIOCOMMUNICATION SYSTEMS, Ser. No. 08/141,085, (Ericsson Reference No. P-05915-US), filed Oct. 16, 1993, in the names of Bo ÅSTRÖM and Roland BODIN, the contents of which are incorporated by reference herein.

The SC-A 1053 can also distribute a Short Message to a subscriber-defined distribution list after converting the SM to one or more desired media according. Upon receiving the Mobile Originated Short Message, the SC-A 1053 acknowledges the same to the IWMSC 1052 as shown at 1073. The IWMSC 1052 in turn acknowledges the successful reception of the MO-SM using the MAP interface to the Visited MSC/VLR 1051. This is shown at 1074. The visited MSC/VLR 1051 then forwards the acknowledgment to MS-A 1060.

In one exemplary embodiment of the SMS system, the MO-SM is sent as a Mobile Terminated Short Message (MT-SM) to the Mobile Station B (MS-B) 1065. The steps involved in this transmission are shown by arrows labeled 1075–1080 in FIG. 10.

First, the SC-A 1053 sends an MT-SM using the SMS-MAP interface to a Gateway MSC handling SM messages (SMS-GMSC) 1054. The SMS-GMSC 1054 then sends a query to the HLR 1055 to determine the present location of the intended recipient of the Short Message. The query to the HLR is performed over the MAP interface using the "Send Routing Info For SM" command.

In response to the query, the HLR 1055 returns inter alia an MSC number and the IMSI (International Mobile Subscriber Identity) to the SMS-GMSC 1054 as shown at 1077. The SMS-GMSC sends the MT-SM to the visited MSC/VLR 1056 using the "Forward SM" command. The visited MSC/VLR 1056 then delivers the MT-SM to the Mobile Subscriber B (MS-B) 1065 who acknowledges receipt to the visited MSC/VLR 1056.

Upon receiving an acknowledgment from MS-B, the Visited MSC/VLR 1056 generates an acknowledgment to the SMS-GMSC 1054 as shown at 1079 over the MAP interface using the "Return Result Component To Forward SM" message. The delivery of the Mobile Terminated Short Message to the intended recipient MB-B 1065 is acknowledged back to the SC-A 1053 as shown at 1080 by transmitting a "Return Result Component To Forward MT-SM" confirmation message.

Networked IPs

Figure 11:
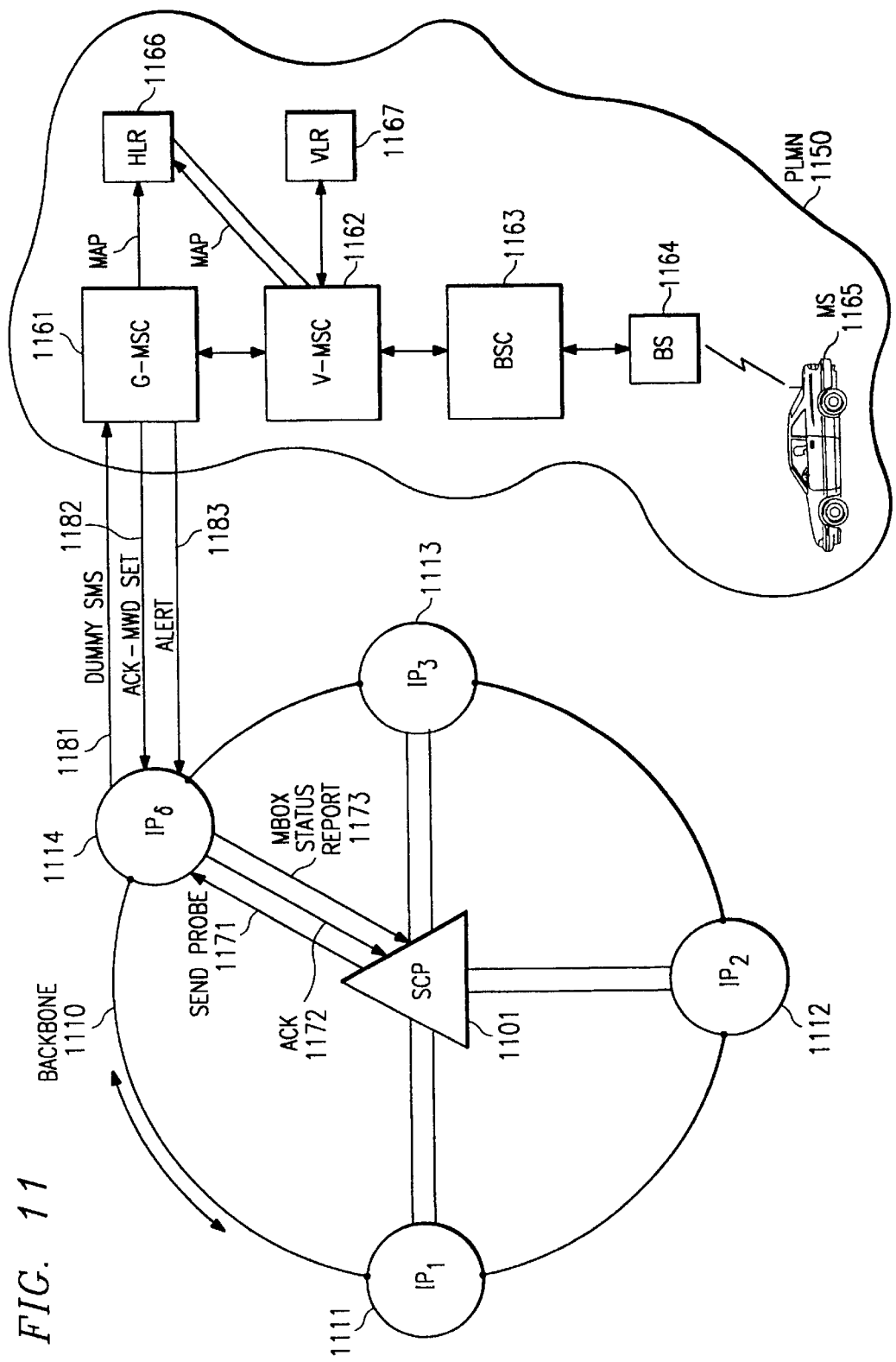
FIG. 11 shows one embodiment of the Networked IP (NIP) system and method of the present invention.

FIG. 11 shows one embodiment of the Networked IP (NIP) system of the present invention. A Networked IP system comprises an SCP 1101 that can communicate with a plurality of Intelligent Peripherals (IPs) 1111–1114. Each of these logical IPs are SRFs in IN terminology, as noted earlier. For illustrative simplicity, only four IPs are shown in FIG. 11: $IP_1$ 1111, $IP_2$ 1112, $IP_3$ 1113 and an SMS-IP, $IP_s$ 1114. The IPs 1111–1114 can communicate amongst each other over a communications backbone 1110 using any protocol, for example, TCP/IP, X.25, etc.

FIG. 11 also provides an overview of the message flow and operation of an embodiment of the present invention. As shown in FIG. 11, the networked IPs 1111–1114 interact with the Public Land Mobile Network (PLMN) 1150 through a Gateway Mobile Services Switching Center (GMSC) 1161. As explained earlier in conjunction with the discussion of FIG. 10, the GMSC 1161 can terminate an SMS message by polling a recipient's Home Location Register (HLR) 1166, ascertaining the current location of a mobile subscriber 1165 and routing the SMS message through a VMSC 1162 and a Base Station Controller (BSC) 1163 and a Base Station (BS) 1164.

The conjunctive operation of an IN system and a PLMN 1150 is illustrated in FIG. 11. The process starts with an SCP 1101 commanding the SMS-IP 1114 to probe the activity status of a mobile subscriber. This is done as shown at 1171 by a "Send Probe" command sent from the SCP to the $IP_s$, the SMS-IP. In response, the SMS-IP 1114 sends a dummy SMS message to the Gateway MSC 1161 as shown at 1181.

It should be noted that the term "dummy SMS message" as used here can be any syntactically-accurate SMS message. The message is called a "dummy" message because it doesn't have to contain any specific content. The dummy SMS message is thus akin to an empty envelope that is sent to an addressee for the purpose of verifying the existence or accuracy of an address. The dummy SMS message is important for what it does or causes (i.e., activation of the message waiting function in a mobile subscribers HLR, as explained below) rather than for what it contains. Thus, a dummy SMS message can be a real SMS message with null contents, or even a defective SMS message that would be rejected by a mobile subscriber if it were active.

Upon receiving the dummy SMS message, the GMSC 1161 activates the storage of non-delivered messages to a mobile subscriber by enabling the Message Waiting Data List (MWD-List). The GMSC also acknowledges the arming of the PLMN to the SMS-IP 1114 as shown at 1182. The SMS-IP 1114 in turn notifies the SCP 1101 at 1172 that the "Send Probe" command has been successfully executed.

Upon the completion of the above actions, the PLMN 1150 has now been armed. When a previously inactive mobile subscriber becomes active, the notification of the renewed activity to HLR 1166 will now result in the triggering of an "Alert" command from the PLMN 1150 to the SMS-IP as shown at 1183. Upon receiving the alert from the GMSC 1161, the SMS-IP 1114 unilaterally generates a "Mailbox Status Report" notification to the SCP 1101 as shown at 1173.

Figure 12:
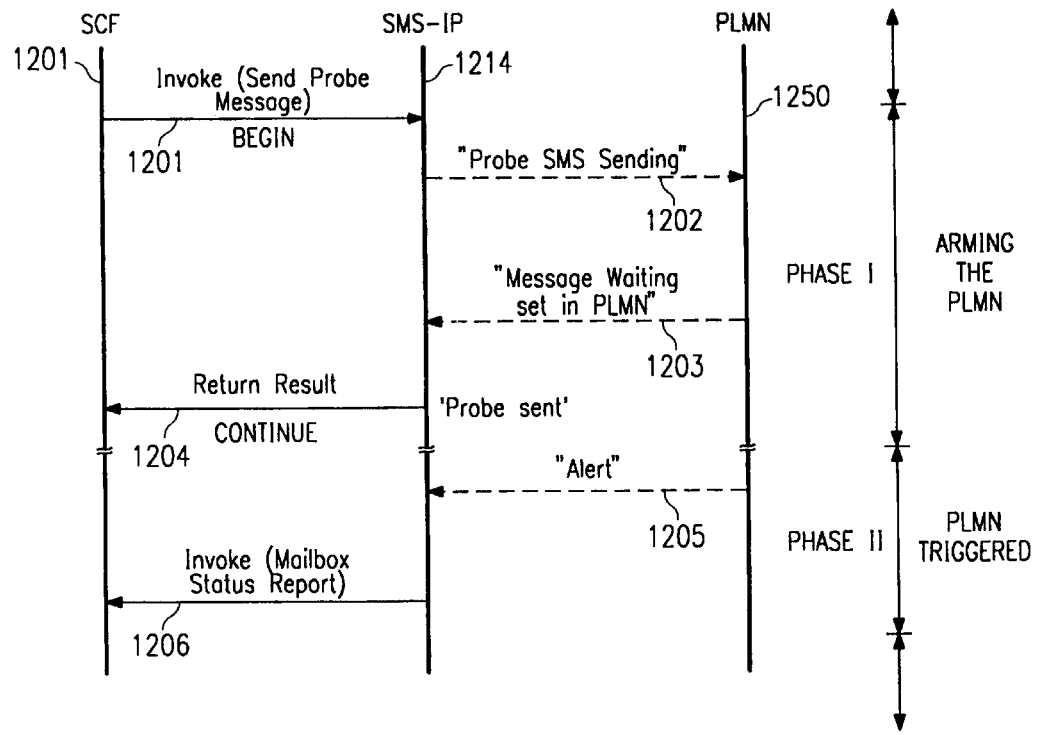
FIG. 12 is an overview sequence diagram illustrating the flow of messages between the various logical entities of the present invention.

FIG. 12 is a sequence diagram illustrating the flow of messages between the various logical entities of the present invention. As shown in FIG. 12, the subscriber activity monitoring process comprises two phases. In the first phase, upon a probed mobile subscriber not being active, the IN system components arm the PLMN system to generate an activity alert. In the second phase, the PLMN generates an alert to the SMS-IP when an erstwhile inactive mobile subscriber becomes active in turn generating a "Mailbox Status Report" to its controlling SCP.

The communications between the SCP and the various IPs 1111–1114 is shown using Transaction Capabilities Application Part (TCAP) notation in FIG. 12, with the message type being shown above the arrow and the components of the TCAP message and the parameters being shown beneath each arrow.

The process begins when an SCP attempts a dial-out and fails. Thus, in the first phase, upon receiving a "Send Probe Message" command from the SCP 1101 as shown at 1201, the SMS-IP 1114 in turn issues a "Probe SMS Sending" command at 1202 to the PLMN system 1150. This causes a flag to be activated in the queried recipient's HLR to indicate that the queried SMS-IP is to be notified when the mobile subscriber next becomes active.

Simultaneously, the PLMN system 1150 activates the storage of undelivered messages to the subscriber by enabling the MWD-List. The PLMN then notifies the SMS-IP 1114 by sending a "Message Waiting Set In PLMN" acknowledgment to the SMS-IP at 1203. This in turn is acknowledged by the SMS-IP 1114 back to the SCP 1101 at 1204. The probe here is an SMS message which makes use of the "Message Waiting" feature of PLMN system that can create a MWD-List in the HLR to retain undelivered messages.

In the second phase, the PLMN triggering notification phase, the PLMN 1205 issues an "Alert" notice to the SMS-IP 1114 at 1205. The-SMS-IP 1114 in turn generates a "Mailbox Status Report" notification to the SCP 1101 as indicated at 1206. After this notification is received, all further action by the SCP is at its own discretion.

An IN service provider may wish to generate a subscriber activity report. Such a feature would permit an SCP to determine whether a specific mobile station is switched on or not. A subscriber activity report of this kind would be particularly useful, for example, if a dial-out notification fails due to a desired mobile station being detached or out of memory. In such a case, it would be useful for the SCP to be able to monitor the activity of the mobile station in order to detect when the mobile station becomes reachable again.

As detailed earlier, the architecture of a standard cellular system presently includes a facility that causes the Home Location Register (HLR) to create a message waiting date list (MWD-List) if an SMS message cannot be delivered to a mobile subscriber. Consequently, it would be useful if this pre-existing feature of the cellular system can be utilized to solve the need to automatically generate a subscriber activity report.

Mailboxes can exist for several different media, for example, voice mail, facsimile mail, e-mail, SMS, etc. In the present disclosure, each medium and its associated mailbox, is referred to as a logical IP. In order to control the messages received by a subscriber in his mailbox, and to facilitate the notification to the SCP or the subscriber when the status of a subscriber's mailbox changes, it would be useful for an SCP to be informed about the status of a subscriber's mailboxes.

The present invention provides a solution for monitoring the activity of mobile subscribers, and consequently, to notify an SCP when renewed subscriber activity is detected. The present invention does this by introducing two new procedures to the NIP-INAP: the "Send Probe" command which enables an SCP to order an SMS-IP to send a dummy SMS message to a mobile station in a PLMN system; and the "Mailbox Status Report" command which enables an IP to report to the SCP when the status of a specific mailbox has changed.

Presently, an IN node is generally unable to monitor an unreachable mobile station. The present invention provides a networked solution based on the IN architecture by defining a protocol to enhance service revenues by increasing the successful message delivery rates.

Another aspect of the present invention enables an SCP to be updated about the status of a subscriber's mailboxes. Two new procedures have been introduced to the NIP-INAP for this purpose: the "Mailbox Status Report" command which enables an IP to notify an SCP when the status of a specific mailbox has changed; and the "Mailbox Status Enquiry" command which enables an SCP to poll or query an IP about the status of a particular subscriber mailbox.

Extensions to NIP-INAP Procedures

We will next consider the detailed operation of the various new procedures that are introduced to the NIP-INAP for the implementation of the preferred embodiment of the present invention. Before an SCP can order an IP to query the activity status of a mobile subscriber in a PLMN system, procedures are necessary to facilitate the notification of the SCP when an alert message has been received by an SMS-IP from a PLMN system.

The "Mailbox Status Report" Message

Figure 13:
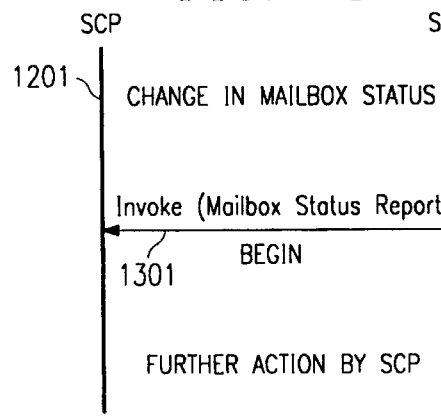
FIG. 13 is a sequence diagram illustrating the operation of the "Mailbox Status Report" command.

The spontaneous report by an IP of the change in mailbox status of a subscriber is implemented by using the "Mailbox Status Report" command. As shown in FIG. 13, the Mailbox Status Report is sent from an SMS-IP, $IP_s$ 1114 to the SCP 1101 upon any change of mailbox status as long as the change in status was not initiated or controlled by the SCP. However, when a message is deposited in a mailbox (i.e., it is received by the IP designated for receiving messages in a certain medium), the SMS-IP generates a "Mailbox Status Report" message even if the SCP is in control. In the discussion that follows, the role of the SMS-IP can be played by any of the other Networked IPs 1111–1113.

It should be noted that at the time of issuance of this notification by the SMS-IP, $IP_s$ 1114, there may or may not be an ongoing dialogue between SCP 1101 and $IP_s$ 1114. In order for the $IP_s$ 1114 to issue the "Mailbox Status Report" message to the SCP, the status of a subscriber's mailbox must change. After receipt of this command by the SCP 1101, further action is at the discretion of the SCP.

If desired, the SCP may obtain detailed information about the status of various messages using the "Mailbox Status Enquiry" command that is discussed below. Although the "Mailbox Status Enquiry" command is not essential to the operation of the preferred embodiment of the present invention, it is discussed below for the sake of completeness.

The "Mailbox Status Enquiry" Message

Figure 14:
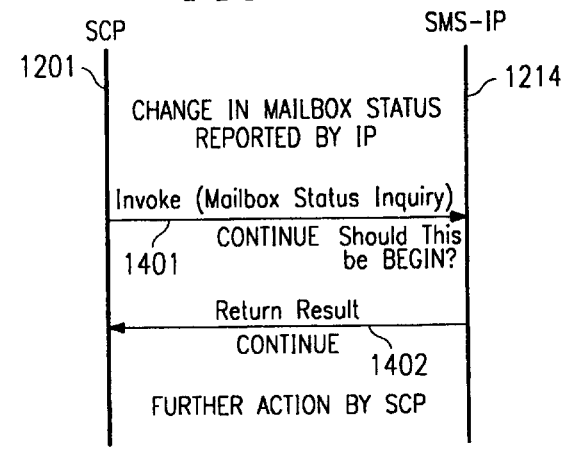
FIG. 14 is a sequence diagram illustrating the operation of the "Mailbox Status Enquiry" command when the SCP asks for brief information about mailbox status.

In contrast to the "Mailbox Status Report" message, which is spontaneously generated by an IP upon any change in mailbox status, the "Mailbox Status Enquiry" message is triggered only by affirmative action by the SCP or upon affirmative subscriber Enquiry about the status of his or her mailbox. FIGS. 14 and 15 show the sequence diagram when an SCP enquiries an IP about the status of a subscriber's mailbox. If $IP_s$ 1114 has reported a change in mailbox status to SCP 1101 using the "Mailbox Status Report" message discussed earlier, and if the SCP 1101 desires to obtain more or detailed information about a subscriber's mailbox or mailboxes, there are two possible outcomes, as shown in FIGS. 14 and 15.

If the SCP 1101 asks $IP_s$ 1114 for brief information about mailbox status, as shown at 1401, then $IP_s$ 1114 can return the desired result to SCP 1101 as shown at 1402 without segmentation of the results. Likewise, if the SCP 1101 queries $IP_s$ 1114 for detailed information about mailbox status, and if no detailed information is available, then too the $IP_s$ 1114 returns the result in a unitary (i.e. unsegmented) message to SCP 1101 as shown at 1402.

On the other hand, if the SCP 1101 queries $IP_s$ 1114 for detailed information about mailbox status, and if such information is available, then $IP_s$ 1114 sends the information to SCP 1101 in multiple segments, as shown in FIG. 15. The process starts with the SCP making a detailed enquiry of the $IP_s$ 1114 at 1501. In response, $IP_s$ 1114 sends part of the results to the SCP at 1502. Thereupon the SCP asks for the remaining information at 1503. $IP_s$ provides another standard Return Result segment at 1504 and (optionally) indicates that still more information remains available.

This process is successively repeated with the SCP 1101 asking for more and more information from $IP_s$ as indicated at 1505 until $IP_s$ returns a Return Result component to the SCP as shown at 1506, indicating that no further information about mailbox status is available. When the SCP has obtained, assembled and analyzed the various segments of the result returned by $IP_s$, all further action on its part is at its own discretion.

In another embodiment of the present invention, the SCP may send a message to a particular recipient, or notify a mailbox owner of the results of the "Mailbox Status Enquiry" command on his mailbox.

The "Mailbox Status Enquiry" command can also be used to service a subscriber who enquires about the status of his or her mailbox or mailboxes. This is illustrated in FIG. 16 for the case when the returned result is not segmented, and in FIG. 17, when the returned result is segmented.

As depicted in FIG. 16, when a user wants to know the status of his mailbox, the SCP issues a "Mailbox Status Enquiry" command as shown at 1602 to $IP_s$ 1114 asking for brief or detailed information as appropriate. If only brief information was asked for at 1601, or if detailed information was asked but was not available, $IP_s$ 1114 returns the result of the enquiry to the SCP as shown at 1602 without segmentation of the results. Thereafter, further action is at the discretion of the SCP 1101.

FIG. 17 shows a sequence diagram when a user makes a detailed enquiry about the status of his mailbox. Upon receiving the enquiry, SCP 1101 issues a "Mailbox Status Enquiry" command to IP$_s$ 1114, as shown at 1701, asking for detailed information about a particular mailbox or mailboxes. IP$_s$ 1114 segments the results to be returned, and sends the first segment back to the SCP as shown at 1702 and indicates that more information remains available. In response, the SCP invokes the "Mailbox Status Enquiry" command a second time at 1703 asking for some or part of the remaining information. The IP$_s$ 1114 responds by returning the second result component to the SCP as shown at 1704 indicating that there is still more information available.

As discussed earlier in connection with the description of the sequence diagram shown in FIG. 15, the SCP 1101 repeatedly issues the "Mailbox Status Enquiry" command to IP$_s$ 1114 as shown at 1705 until IP$_s$ 1114 transmits a Return Result component as shown at 1706 indicating that no more information is available. The SCP then assembles and analyzes the segmented result components returned and performs further actions at its own discretion.

The "Mailbox Status Report" and "Mailbox Status Enquiry" commands make it possible to initiate an alert to the SCP or to a subscriber when the status of the subscriber's mailbox has changed and to centrally control all of a subscriber's different types of mailboxes despite the fact that they are located at physically and/or logically distinct IPs.

We next consider the Subscriber Activity Supervision Service in further detail. Automating the monitoring and third-party notification of renewed activity by subscribers in a PLMN system has long been desired by subscribers and telecommunications service providers. As indicated earlier, there are no procedures within the presently defined IN architecture to monitor an inactive or unreachable mobile station.

The present invention permits an SCP to monitor the activity of a presently-quiescent mobile station by introducing two new procedures: the "Send Probe" command which enables an SCP to order an SMS-IP to probe the activity status of a mobile subscriber in a PLMN and the "Mailbox Status Report" notification which enables an SCP to be notified when a subscriber's mailbox status changes.

In the sequence diagrams presented below, a specific IP IP$_s$ 1114, referred to as the SMS-IP, is used for the exchange of messages between an IN node and a PLMN subscriber. However, it should be emphasized that the actual exchange can take place from an SMS-IP, from any IP supporting SMS messages, or from any other IP containing the necessary processing power and system resources.

The "Send Probe" Command

Figure 18:
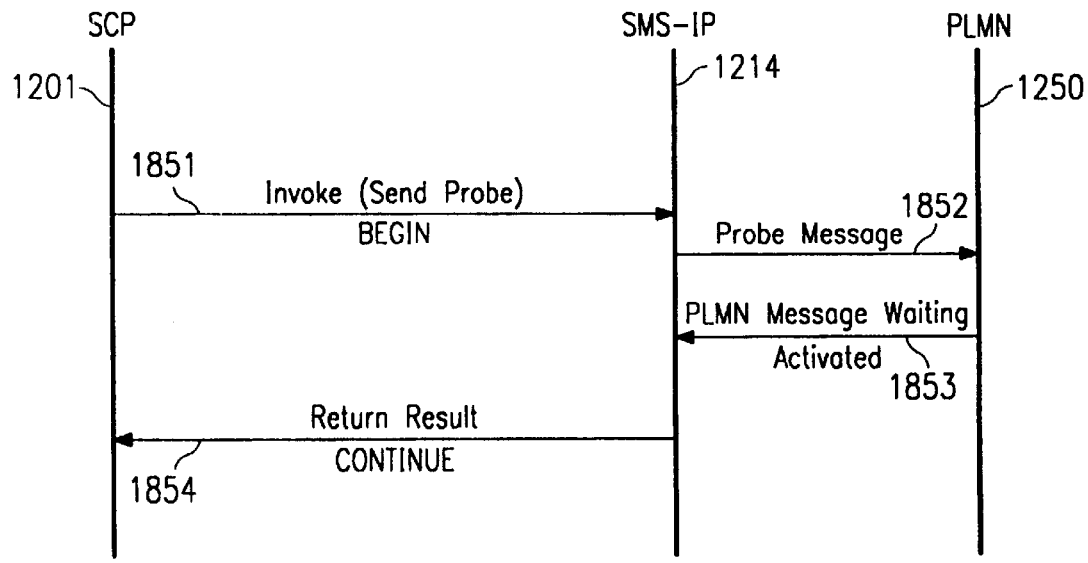
FIG. 18 shows the sequence diagram when the SCP probes the activity status of a mobile subscriber.

FIG. 18 shows the sequence diagram when the SCP probes the activity status of a mobile subscriber. As indicated here, the "Send Probe" command makes use of the pre-existing feature in second-generation PLMN systems that causes the Home Location Register (HLR) in the PLMN to create a Message Waiting Data List (MWD-List) whenever a message cannot be delivered to a subscriber.

When an MS is found to be unreachable, the process begins as shown at 1851 with the SCP 1101 issuing a "Send Probe" message to an SMS-IP 1114. The SMS-IP 1114 in turn sends a dummy SMS message to the unreachable MS in the PLMN 1150, as shown at 1852. Since the MS is unreachable, the HLR corresponding to the MS in the PLMN 1150 creates an MWD-List for the recipient of the dummy SMS message.

The PLMN, acting through the SMS Gateway MSC, acknowledges the activation of the MWD-List to the SMS-IP 1115 as shown at 1853. This report of successful completion is forwarded in an appropriate format by the SMS-IP 1114 to the SCP 1101 as shown at 1854.

As detailed earlier, upon the MS becoming reachable, an alert is generated by the PLMN 1150 to the SMS-IP 1114 causing the SMS-IP to issue a "Mailbox Status Report" message to the SCP 1101.

SCP and IP Finite State Machines

Figure 19:
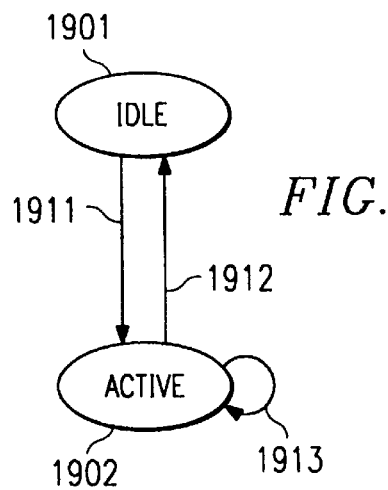
FIG. 19 shows the finite state machine for the SCP during the operation of the present invention.
Figure 20:
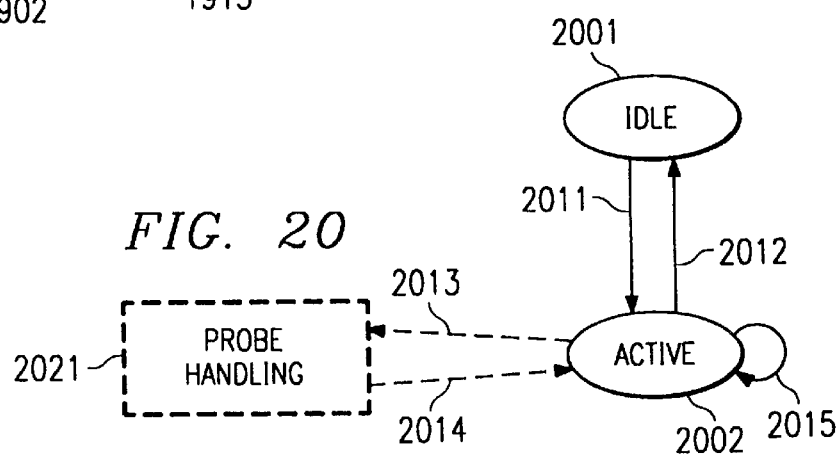
FIG. 20 shows the finite state machine for the IP during the operation of the present invention.

FIGS. 19 and 20 show the finite state machines for the SCP 1101 and the SMS-IP 1114 of the present invention. In FIGS. 19 and 20, the states of the machine are symbolized with an oval, while events causing state transitions are drawn by continuous arrows. Functions are depicted within broken rectangles, while actions ordered by the functions are indicated by broken arrows.

FIG. 19 shows the finite state machine for the SCP. As can be seen, the SCP has two states: the Idle state 1901 and the Active state 1902. The SCP goes from the Idle state 1901 to the Active state 1902 upon issuing a "Send Probe" command to the SMS-IP 1114, as shown at 1911.

The SCP goes from the Active state 1902 to the Idle state 1901 as shown at 1912 upon normal termination of the dialogue between the SCP and the IPs, if a dialogue were rejected due to the presence of improper components, if a dialogue is aborted from either side or if the operation is timed out. The SCP 1101 loops (i.e. remains) in the Active state 1902 without any state transition as shown at 1913 upon the receipt of the results of the "Send Probe" message from the SMS-IP 1114.

FIG. 20 shows the finite state machine from the IP side. The SMS-IP has two principal states: the Idle state 2001 and the Active state 2002. There is also one additional quasi-state: the PLMN Probe Handling state 2021.

As shown in FIG. 20, the SMS-IP 1114 goes from Idle state 2001 to the Active state 2002 upon receiving the "Send Probe" command from the SCP 1101, as shown at 2011. An IP transitions from the Active state 2002 to the Idle state 2001 as shown at 2012 upon normal termination of the dialogue with the SCP or upon rejection of an offered result by the SCP or upon an abort of the dialogue between an SCP and IP from either side.

If an SMS-IP 1114 receives the "Send Probe" command, the transition from the Idle state 2001 to the Active state 2002 is additionally accompanied by the transmission of the Mobile Terminated Probe Message to the PLMN probe handler as shown at 2013 and the return of the results of the same as shown at 2014. The SMS-IP loops (i.e. remains) in the Active state 2002 upon returning the results of the "Send Probe" message back to the SCP as shown at 2015.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. In a method for indicating actively of an initially-inactive mobile subscriber operable in a PLMN (Public Land Mobile Network) system, an improvement of a method for indicating at least a change in the activity of the mobile subscriber from an IN (Intelligent Network) telecommunications system comprising a plurality of IPs (Intelligent Peripherals) connected to an SCP (Service Control Point) over a network, the IN system coupled to the PLMN system, said method comprising the steps of:

sending a dummy SMS message to said mobile subscriber to determine an initial activity status of said mobile subscriber;

arming said PLMN system from said IN system to detect renewed activity by said mobile subscriber;

monitoring at least during selected periods, the activity status of said mobile subscriber in said PLMN system;

transmitting an alert message from said PLMN system to said IN system when renewed activity of the mobile subscriber in said PLMN system is detected during said step of monitoring; and generating an internal notification within said IN system in response to the receipt of said alert message from said PLMN system to said IN system.

2. The method of claim 1 wherein said step of arming said PLMN system comprises the step of conditionally activating a trigger function in said PLMN system.

3. The method of claim 2 wherein said step of conditionally activating a trigger function in said PLMN system is implemented by creating a Message Waiting Data List (MWD-List) in a Home Location Register (HLR) of the mobile subscriber in the PLMN system.

4. In a method for indicating actively of an initially-inactive mobile subscriber operable in a PLMN (Public Land Mobile Network) system, an improvement of a method for indicating at least a change in the activity of the mobile subscriber from an IN (Intelligent Network) telecommunications system comprising a plurality of IPs (Intelligent Peripherals) connected to an SCP (Service Control Point) over a network, the IN system coupled to the PLMN system, said method comprising the steps of:

arming said PLMN system from said IN system to detect renewed activity by said mobile subscriber;

sending a dummy SMS message from said IN system to said PLMN system;

monitoring at least during selected periods, the activity status of said mobile subscriber in said PLMN system;

transmitting an alert message from said PLMN system to said IN system when renewed activity of the mobile subscriber in said PLMN system is detected during said step of monitoring; and generating an internal notification within said IN system in response to the receipt of said alert message from said PLMN system to said IN system.

5. The method of claim 4 wherein said dummy SMS message sent during said step of sending a dummy SMS message is sent from an SMS-IP to an SMS-GMSC, the SMS-IP being a specialized Intelligent Peripheral in the IN system that is dedicated to handling SMS messages, and the SMS-GMSC being a Gateway Mobile Service Center in the PLMN system that is dedicated to handling SMS messages.

6. A method for indicating at least a change in activity status of a mobile subscriber operable in a PLMN (Public Land Mobile Network) system in conjunction with an IN (Intelligent Network) telecommunications system comprising a plurality of IPs (Intelligent Peripherals) connected to an SCP (Service Control Pooint) over a network, said IN system coupled to said PLMN system, comprising the steps of:

arming said PLMN system from said IN system to detect renewed activity by said mobile subscriber, wherein said step of arming said PLMN system comprises the step of sending a dummy SMS (Short Message Service) message from said IN system to said PLMN system;

monitoring, at least during selected periods, said activity status of said mobile subscriber in said PLMN system;

transmitting an alert message from said PLMN system to said IN system when renewed activity by said mobile subscriber in said PLMN system is detected during said step of monitoring; and generating an internal notification within said IN system in response to receipt of said alert message at said IN system from said PLMN system.

7. The method of claim 6, further comprising the preliminary step of: determining an initial activity status of said mobile subscriber, and wherein said step of arming is performed responsive to a determination that said mobile subscriber is inactive.

8. The method of claim 7, wherein said step of determining an initial activity status of said mobile subscriber comprises the step of sending a message to said mobile subscriber in the SMS format.

9. The method of claim 8, wherein said message in the SMS format comprises a dummy SMS message.

10. The method of claim 6, wherein said dummy SMS message sent during said step of sending a dummy SMS message is sent from an SMS-IP to an SMS-GMSC, said SMS-IP being a specialized IP (Intelligent Peripheral) in said IN system that is dedicated to handling SMS messages, and said SMS-GMSC being a GMSC (Gateway Mobile Service Center) in said PLMN system that is dedicated to handling SMS messages.

11. The method of claim 10, wherein said dummy SMS message sent from said SMS-IP to said SMS-GMSC is send under control of said SCP of said IN system.

12. The method of claim 6, wherein said step of arming said PLMN system further comprises the step of conditionally activating a trigger function in said PLMN system.

13. The method of claim 12, wherein said step of conditionally activating a trigger function in said PLMN system is implemented by creating an MWD-List (Message Waiting Data List) in an HLR (Home Location Register) of said mobile subscriber in said PLMN system.

14. The method of claim 6, further comprising the step of sending an acknowledgment from an SMS-GMSC to an SMS-IP when the arming of said PLMN system has been completed, said SMS-GMSC being a GMSC (Gateway Mobile Service Center) in said PLMN system that is dedicated to handling SMS messages, and said SMS-IP being a specialized IP (Intelligent Peripheral) in said IN system that is dedicated to handling SMS messages.

15. The method of claim 6, wherein said alert message transmitted during said step of transmitting is sent from an SMS-GMSC to an SMS-IP, said SMS-GMSC being a GMSC (Gateway Mobile Service Center) in said PLMN system that is dedicated to handling SMS messages, and said SMS-IP being a specialized IP (Intelligent Peripheral) in said IN system that is dedicated to handling SMS messages.

16. The The method of claim 6, wherein said step of transmitting an alert message from said PLMN system to said IN system if performed responsive to detection of a notification to an HLR (Home Location Register) of said mobile subscriber when said mobile subscriber transitions to an active status.

17. The method of claim 6, wherein said step of generating an internal notification within said IN system comprises the step of sending a predetermined message from an SMS-IP to said SCP of said IN system, said SMS-IP being a specialized IP (Intelligent Peripheral) in said IN system that is dedicated to handling SMS messages.

18. The method of claim 6, wherein said step of arming said PLMN system further comprises the step of issuing a SEND PROBE command.

19. The method of claim 6, wherein said step of generating an internal notification within said IN system is performed using, at least in part, a MAILBOX STATUS REPORT command.

20. In an IN (Intelligent Network) telecommunications system and a PLMN (Public Land Mobile Network) system, said IN system comprising a plurality of IPs (Intelligent Peripherals) connected to an SCP (Service Control Point) over a network, said IN system being further connected to said PLMN system, a system for monitoring the activity status of a mobile subscriber in said PLMN system, said system comprising:

means for determining an initial activity status of said mobile subscriber in said PLMN system;

means for remotely arming said PLMN system from said IN system to detect renewed activity by said mobile subscriber responsive to a determination that said mobile subscriber is presently inactive, wherein said means for remotely arming said PLMN system comprises means for sending a dummy SMS (Short Message Service) message from said IN system to said PLMN system;

means for at least intermittently monitoring said activity status of said mobile subscriber in said PLMN system;

means for triggering and transmitting an alert message from said PLMN system to said IN system when renewed activity by said mobile subscriber in said PLMN system is detected; and means for generating an internal notification within said IN system in response to receipt of said alert message at said IN system from said PLMN system.

21. The system of claim 20, wherein said means for determining an initial activity status of said mobile subscriber comprises means for sending a message to said mobile subscriber in the SMS format.

22. The system of claim 21, wherein said message in the SMS format comprises a dummy SMS message.

23. The system of claim 20, wherein said means for remotely arming said PLMN system furthercomprises means for conditionally activating a trigger function in said PLMN system.

24. The system of claim 23, wherein said means for conditionally activating a trigger function in said PLMN system comprises means for creating an MWD-List (Message Waiting Data List) in an HLR (Home Location Register) of said mobile subscriber in said PLMN system.

25. The system of claim 20, wherein said dummy SMS message is sent from an SMS-IP to an SMS-GMSC, said SMS-IP being a specialized IP (Intelligent Peripheral) in said IN system that is dedicated to handling SMS messages, and said SMS-GMSC being a GMSC (Gateway Mobile Service Center) in said PLMN system that is dedicated to handling SMS messages.

26. The system of claim 25, wherein said dummy SMS message is sent from said SMS-IP to said SMS-GMSC under control of said SCP of said IN system.

27. The system of claim 20, further comprising means for sending an acknowledgment from an SMS-GMSC to an SMS-IP when the remote arming of said PLMN system has been completed, said SMS-GMSC being a GMSC (Gateway Mobile Service Center) in said PLMN system that is dedicated to handling SMS messages, and said SMS-IP being a specialized IP (Intelligent Peripheral) in said IN system that is dedicated to handling SMS messages.

28. The system of claim 20, wherein said alert message is sent from and SMS-GMSC to an SMS-IP, said SMS-GMSC being a GMSC (Gateway Mobile Service Center) in said PLMN system that is dedicated to handling SMS messages, and said SMS-IP being a specialized IP (Intelligent Peripheral) in said IN system that is dedicated to handling SMS messages.

29. The system of claim 20, wherein said means for triggering and transmitting an alert message from said PLMN system to said IN system operates responsive to detection of a notification to an HLR (Home Location Register) of said mobile subscriber when said mobile subscriber transitions to an active status.

30. The system of claim 20, wherein said means for generating an internal notification within said IN system comprises means for sending a predetermined message from an SMS-IP to said SCP of said IN system, said SMS-IP being a specialized IP (Intelligent Peripheral) in said IN system that is dedicated to handling SMS messages.

31. The system of claim 20, wherein said means for remotely arming said PLMN system further comprises means for issuing a SEND PROBE command.

32. The system of claim 20, wherein said means for generating an internal notification within said IN system comprises means for transmitting a MAILBOX STATUS REPORT command.

* * * * *

UNITED STATES PATENT AND TRADEMARK OFFICE
CERTIFICATE OF CORRECTION

PATENT NO. : 6,058,303
DATED : May 5, 2000
INVENTOR(S) : Astrom et al.

It is certified that error appears in the above-identified patent and that said Letters Patent is hereby corrected as shown below:

<u>Column 20, line 56 through Column 21, line 11,</u>
Replace

"1. In a method for indicating actively of an initially-inactive mobile subscriber operable in a PLMN (Public Land Mobile Network) system, an improvement of a method for indicating at least a change in the activity of the mobile subscriber from an IN (Intelligent Network) telecommunications system comprising a plurality of Ips (Intelligent Peripherals) connected to an SCP (Service Control Point) over a network, the IN system coupled to the PLMN system, said method comprising the steps of:

Sending a dummy SMS message to said mobile subscriber to determine an initial activity status of said mobile subscriber;

arming said PLMN system from said IN system to detect renewed activity by said mobile subscriber;

monitoring at least during selected periods, the activity status of said mobile subscriber in said PLMN system;

transmitting an alert message from said PLMN system to said IN system when renewed activity of the mobile subscriber in said PLMN system is detected during said step of monitoring; and generating an internal notification within said IN system in response to the receipt of said alert message from said PLMN system to said IN system."

UNITED STATES PATENT AND TRADEMARK OFFICE
CERTIFICATE OF CORRECTION

PATENT NO. : 6,058,303
DATED : May 5, 2000
INVENTOR(S) : Astrom et al.

It is certified that error appears in the above-identified patent and that said Letters Patent is hereby corrected as shown below:

Column 20, line 56 through Column 21, line 11 (cont'd), with --
```
30. In an IN (Intelligent Network),
apparatus for indicating at least
an activity-status change of an
initially-inactive mobile
subscriber operable in a PLMN
(Public Land Mobile Network), the
PLMN coupled to the IN, said
apparatus comprising;

a SCP (Service Control Point) for
controlling initiation of
monitoring of the mobile subscriber
and for receiving indications of
the change in status of the
initially-inactive mobile
subscriber; and an SMS-IP (Short Message Service-
Intelligent Peripheral) coupled to
said SCP and to the PLMN, said SMS-
IP for initiating arming of the
PLMN to detect renewed activity of
the mobile subscriber, for
receiving an alert from the PLMN
alerting said SMS-IP of the change
in status, and for providing said
SCP with the indications of the
change in the status of the mobile
subscriber.                          --
```

Column 21,
Lines 12-14, replace

```
"2. The method of claim 1
wherein said step of arming said
PLMN system comprises the step of
conditionally activating a trigger
function in said PLMN system."
``` with --
```
31. The apparatus of claim 30
wherein said SCP initiates the
monitoring of the mobile subscriber
by issuing a SEND PROBE command to
said SMS-IP.--
```

UNITED STATES PATENT AND TRADEMARK OFFICE
CERTIFICATE OF CORRECTION

PATENT NO.   : 6,058,303
DATED        : May 5, 2000
INVENTOR(S)  : Astrom et al.

It is certified that error appears in the above-identified patent and that said Letters Patent is hereby corrected as shown below:

<u>Column 21 (cont'd),</u>

Lines 15-19, replace "3. The method of claim 2 wherein said step of conditionally activating a trigger function in said PLMN system is implemented by creating a Message Waiting Data List (MWD-List) in a Home Location Register (HLR) of the mobile subscriber in the PLMN system."

with -- 32. The apparatus of claim 31 wherein said SMS-IP is operable responsive to reception of the SEND PROBE command to initiate the arming of the PLMN.--

Lines 20-42, replace "4. In a method for indicating actively of an initially-inactive mobile subscriber operable in a PLMN (Public Land Mobile Network) system, an improvement of a method for indicating at least a change in the activity of the mobile subscriber from an IN (Intelligent Network) telecommunications system comprising a plurality of Ips (Intelligent Peripherals) connected to an SCP (Service Control Point) over a network, the IN system coupled to the PLMN system, said method comprising the steps of:

arming said PLMN system from said IN system to detect

UNITED STATES PATENT AND TRADEMARK OFFICE
CERTIFICATE OF CORRECTION

PATENT NO. : 6,058,303  
DATED : May 5, 2000  
INVENTOR(S) : Astrom et al.

Page 4 of 5

It is certified that error appears in the above-identified patent and that said Letters Patent is hereby corrected as shown below:

<u>Column 21 (cont'd),</u>

```
            renewed activity by said
            mobile subscriber;

sending a dummy SMS message
            from said IN system to said
            PLMN system:

Monitoring at least during
            selected periods, the activity
            status of said mobile
            subscriber in said PLMN
            system;

transmitting an alert message
            from said PLMN system to said
            IN system when renewed
            activity of the mobile
            subscriber in said PLMN system
            is detected during said step
            of monitoring; and generating an internal
            notification within said IN
            system in response to the
            receipt of said alert message
            from said PLMN system to said
            IN system."
``` with --   33.  The apparatus of claim 32 wherein said SMS-IP initiates the arming of the PLMN by sending a message to the mobile subscriber, the message formatted in a Short Message Service (SMS) format.--

UNITED STATES PATENT AND TRADEMARK OFFICE
CERTIFICATE OF CORRECTION

PATENT NO.   : 6,058,303
DATED        : May 5, 2000
INVENTOR(S)  : Astrom et al.

It is certified that error appears in the above-identified patent and that said Letters Patent is hereby corrected as shown below:

<u>Column 21 (cont'd),</u>
Lines 43-49, replace "5. The method of claim 4 wherein said dummy SMS message sent during said step of sending a dummy SMS message is sent from an SMS-IP to an SMS-GMSC, the SMS-IP being a specialized Intelligent Peripheral in the IN system that is dedicated to handling SMS messages, and the SMS-GMSC being a Gateway Mobile Service Center in the PLMN system that is dedicated to handling SMS messages."

with -- 34. The apparatus of claim 30 wherein said SMS-IP provides said SMS-IP with the indications of the change in status of the mobile subscriber by issuing a MAILBOX STATUS REPORT to said SCP, the MAILBOX STATUS REPORT issued responsive to receipt, at said SMS-IP, of the alert from the PLMN.--

Signed and Sealed this

Sixteenth Day of December, 2003

JAMES E. ROGAN
*Director of the United States Patent and Trademark Office*